(12) United States Patent
Hurst et al.

(10) Patent No.: US 12,013,047 B1
(45) Date of Patent: *Jun. 18, 2024

(54) PRESSURE LOSS MITIGATION AND DURABLE VALVE

(71) Applicant: Colt Irrigation, LLC, Santa Barbara, CA (US)

(72) Inventors: William E. Hurst, Goleta, CA (US); James Walter Hurst, Goleta, CA (US)

(73) Assignee: Colt Irrigation, LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,602

(22) Filed: Jun. 28, 2023

Related U.S. Application Data

(63) Continuation of application No. 17/676,009, filed on Feb. 18, 2022, now Pat. No. 11,713,816, which is a continuation-in-part of application No. 17/180,424, filed on Feb. 19, 2021, now Pat. No. 11,313,476, which is a continuation of application No. 16/998,903, filed on Aug. 20, 2020, now Pat. No. 10,927,962.

(60) Provisional application No. 63/202,048, filed on May 25, 2021, provisional application No. 63/151,412, filed on Feb. 19, 2021, provisional application No.
(Continued)

(51) Int. Cl.
| | |
|---|---|
| *F16K 3/04* | (2006.01) |
| *F16K 3/02* | (2006.01) |
| *F16K 3/18* | (2006.01) |
| *F16K 27/02* | (2006.01) |
| *F16K 31/04* | (2006.01) |
| *F16K 31/54* | (2006.01) |

(52) U.S. Cl.
CPC .............. *F16K 3/04* (2013.01); *F16K 3/0218* (2013.01); *F16K 3/188* (2013.01); *F16K 27/029* (2013.01); *F16K 31/047* (2013.01); *F16K 31/54* (2013.01)

(58) Field of Classification Search
CPC ........................... F16K 3/0281; F16K 3/0218
USPC ........................ 251/333, 326, 193, 175, 279
See application file for complete search history.

(56) References Cited

U.S. PATENT DOCUMENTS

| | | |
|---|---|---|
| 316,913 A | 4/1885 | Prunty |
| 776,727 A | 12/1904 | Collar |
| (Continued) | | |

FOREIGN PATENT DOCUMENTS

| | | |
|---|---|---|
| CA | 2605898 | 4/2008 |
| WO | WO 2020/208483 A1 | 10/2020 |

*Primary Examiner* — Robert K Arundale
(74) *Attorney, Agent, or Firm* — Knobbe, Martens, Olson & Bear LLP

(57) ABSTRACT

A valve comprises: a housing defining a chamber; a fluid outlet defined by a fluid outlet wall; and a first fluid outlet orifice and a second fluid outlet orifice comprising a rigid seat. The valve comprises a movable gate, that is flexible and/or compressible and impermeable. The moveable gate is more flexible than the rigid seat, has a planar surface, and is configured to slidably move in a first axis. The movable gate is configured to be positioned so that it is located between a fluid inlet orifice and the second fluid outlet orifice when the valve is in a closed position, wherein fluid pressure within the chamber causes the movable gate to seal the second fluid outlet orifice via the rigid seat, and not the fluid inlet orifice. The valve may employ gate shapes that generate and/or exploit Bernoulli effect forces when fluid passes though the valve.

45 Claims, 14 Drawing Sheets

Related U.S. Application Data

62/986,277, filed on Mar. 6, 2020, provisional application No. 62/890,521, filed on Aug. 22, 2019.

(56) References Cited

U.S. PATENT DOCUMENTS

| | | |
|---|---|---|
| 921,209 A | 5/1909 | Demarest |
| 993,693 A | 5/1911 | La Lande et al. |
| 1,190,958 A | 7/1916 | Selden |
| 1,548,634 A | 8/1925 | Schiller |
| 1,666,531 A | 4/1928 | Glauber |
| 1,782,238 A | 11/1930 | Kirchhan |
| 1,918,602 A | 7/1933 | Joyce |
| 2,022,875 A | 12/1935 | Zinkil et al. |
| 2,043,337 A * | 6/1936 | Smith ............ F16K 35/06 220/86.1 |
| 2,527,050 A | 10/1950 | Abercrombie |
| 2,605,898 A | 8/1952 | Persson et al. |
| 2,628,056 A | 2/1953 | Fuller |
| 2,640,498 A | 6/1953 | Bissell |
| 2,647,802 A | 8/1953 | Hornbrook |
| 2,796,230 A * | 6/1957 | Grove ............ F16K 3/0236 251/282 |
| 2,835,468 A | 5/1958 | Sparks |
| 2,885,174 A | 5/1959 | Setka |
| 2,968,311 A | 1/1961 | Whitlock, Jr. |
| 2,984,418 A | 5/1961 | Dickmann et al. |
| 3,170,669 A | 2/1965 | Roos |
| 3,202,162 A | 8/1965 | Echardt et al. |
| 3,369,565 A | 2/1968 | Haggard, Jr. |
| 3,387,816 A | 6/1968 | Holycross |
| 3,457,950 A | 7/1969 | Over |
| 3,460,560 A | 8/1969 | Kah et al. |
| 3,482,816 A | 12/1969 | Arnold |
| 3,489,389 A | 1/1970 | Kaatz |
| 3,524,470 A | 8/1970 | Kah et al. |
| 3,559,947 A | 2/1971 | Sette |
| 3,635,237 A | 1/1972 | Kah, Jr. |
| 3,727,880 A | 4/1973 | Stock |
| 3,785,391 A | 1/1974 | Miller |
| 3,906,990 A | 9/1975 | Nelson |
| 3,910,554 A | 10/1975 | Speedie |
| 3,924,652 A | 12/1975 | Kah, Jr. |
| 3,933,339 A | 1/1976 | Dietzsch |
| 4,004,611 A | 1/1977 | Friedell |
| 4,029,289 A | 6/1977 | Miffre |
| 4,034,775 A | 7/1977 | Slagel |
| 4,103,863 A | 8/1978 | Houlgrave et al. |
| 4,109,670 A | 8/1978 | Slagel |
| 4,125,124 A | 11/1978 | Kah |
| 4,131,131 A | 12/1978 | Frisch |
| 4,161,307 A | 7/1979 | Clinch et al. |
| 4,178,963 A | 12/1979 | Riefler et al. |
| 4,219,182 A | 8/1980 | Schneck |
| 4,256,283 A * | 3/1981 | Reneau ............ F16K 1/16 251/87 |
| 4,291,861 A | 9/1981 | Faria |
| 4,313,815 A | 2/1982 | Graves, Jr. et al. |
| 4,316,480 A | 2/1982 | Kah, Jr. |
| 4,328,949 A | 5/1982 | Oddenino |
| 4,353,386 A | 10/1982 | Slagel |
| 4,484,728 A | 11/1984 | Moore |
| 4,492,247 A | 1/1985 | Lockwood |
| 4,504,266 A | 3/1985 | Harle |
| 4,546,787 A | 10/1985 | Meyers et al. |
| 4,561,471 A | 12/1985 | Diaz |
| 4,671,487 A | 6/1987 | Bragin et al. |
| 4,796,657 A | 1/1989 | Baker |
| 4,877,047 A | 10/1989 | Isidoro |
| 5,040,567 A | 8/1991 | Nestler et al. |
| 5,445,190 A | 8/1995 | Gunder |
| 5,449,146 A | 9/1995 | Weagraff |
| 5,465,748 A | 11/1995 | Bowers |
| 5,501,427 A | 3/1996 | Ando |
| 5,671,774 A | 9/1997 | Klein et al. |
| 5,735,501 A | 4/1998 | Maurer et al. |
| 6,325,096 B1 | 12/2001 | Rising et al. |
| 6,374,853 B1 | 4/2002 | Callies |
| 6,394,412 B2 | 5/2002 | Zakai et al. |
| 6,439,539 B1 | 8/2002 | Powell |
| 6,923,205 B2 | 8/2005 | Callies |
| 7,140,595 B2 | 4/2006 | Youngberg et al. |
| 7,048,001 B2 | 5/2006 | Youngberg et al. |
| 7,051,994 B2 | 5/2006 | Carlson |
| 7,168,444 B2 | 1/2007 | Sesser et al. |
| 7,341,100 B2 | 3/2008 | Michaelsen et al. |
| 7,370,667 B2 | 5/2008 | Sesser et al. |
| 7,401,622 B2 | 7/2008 | Ungerecht |
| 7,866,629 B2 | 1/2011 | Harlow et al. |
| 8,215,332 B1 | 7/2012 | Hubschmitt et al. |
| 8,397,745 B2 | 3/2013 | Hurst |
| 8,567,433 B2 | 10/2013 | Ungerecht et al. |
| 8,678,029 B2 | 3/2014 | Ungerecht et al. |
| 8,910,888 B2 | 12/2014 | Sesser et al. |
| 9,004,097 B2 | 4/2015 | Crawford et al. |
| 9,010,660 B2 | 4/2015 | Sesser et al. |
| 9,095,859 B2 | 8/2015 | Sesser et al. |
| 9,242,257 B2 | 1/2016 | McGee |
| 9,341,281 B2 | 5/2016 | Hurst |
| 9,367,070 B2 | 6/2016 | Greenwood et al. |
| 9,387,494 B2 | 7/2016 | Sesser et al. |
| 9,574,677 B2 | 2/2017 | Fletcher et al. |
| 9,599,286 B2 | 3/2017 | Hurst |
| 9,791,052 B2 | 10/2017 | Blecha |
| 9,839,801 B2 | 12/2017 | Kolacz et al. |
| 9,841,110 B2 | 12/2017 | Fletcher et al. |
| 9,841,769 B2 | 12/2017 | Hurst |
| 9,845,899 B2 | 12/2017 | Graichen et al. |
| 9,971,361 B2 | 5/2018 | Greenwood et al. |
| 10,088,849 B2 | 10/2018 | Hurst |
| 10,100,622 B2 | 10/2018 | Gonzalez |
| 10,323,768 B2 | 6/2019 | Tuineag |
| 10,386,867 B2 | 8/2019 | Dreschsel |
| 10,416,689 B2 | 9/2019 | Greenwood et al. |
| 10,508,751 B2 | 12/2019 | Neal |
| 10,571,030 B2 | 2/2020 | Hampton et al. |
| 10,571,937 B1 | 2/2020 | Hurst |
| 10,794,511 B2 | 10/2020 | Tuineag |
| 11,045,824 B1 | 6/2021 | Duffin et al. |
| 11,048,280 B2 | 6/2021 | Duffin et al. |
| 11,144,077 B2 | 10/2021 | Weingarten |
| 11,175,682 B2 | 11/2021 | Segat |
| 11,749,540 B2 | 9/2023 | Merry et al. |
| 2003/0132001 A1 | 7/2003 | Wilson et al. |
| 2005/0178435 A1 | 8/2005 | Tsai |
| 2006/0131534 A1 | 6/2006 | Leroux |
| 2009/0057597 A1 | 3/2009 | Ji |
| 2009/0084997 A1 | 4/2009 | Lee |
| 2009/0095932 A1 | 4/2009 | Leblanc et al. |
| 2010/0193721 A1 | 8/2010 | Melle |
| 2010/0294370 A1 | 11/2010 | Patterson et al. |
| 2011/0006236 A1 | 1/2011 | Williams |
| 2015/0053420 A1 | 2/2015 | Fripp et al. |
| 2015/0060084 A1 | 3/2015 | Moen et al. |
| 2016/0033047 A1 | 2/2016 | Seo |
| 2017/0071444 A1 | 3/2017 | Hofmann et al. |
| 2020/0026313 A1 | 1/2020 | Weingarten |
| 2023/0146980 A1 | 5/2023 | Trotter |

\* cited by examiner

Open

Midway

Closed

Lever position: Valve open

Lever position: Between Open & Close

Lever position: Valve closed

FIG. 1P
3/4" Valve: Outside dimensions
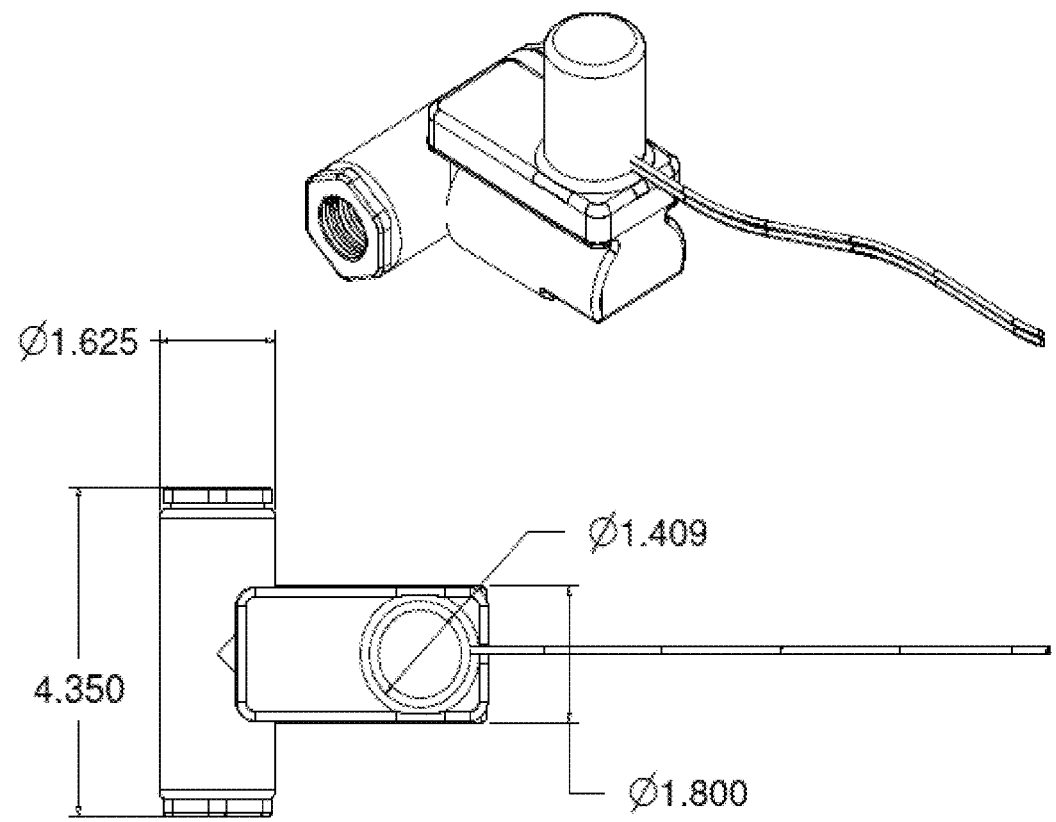
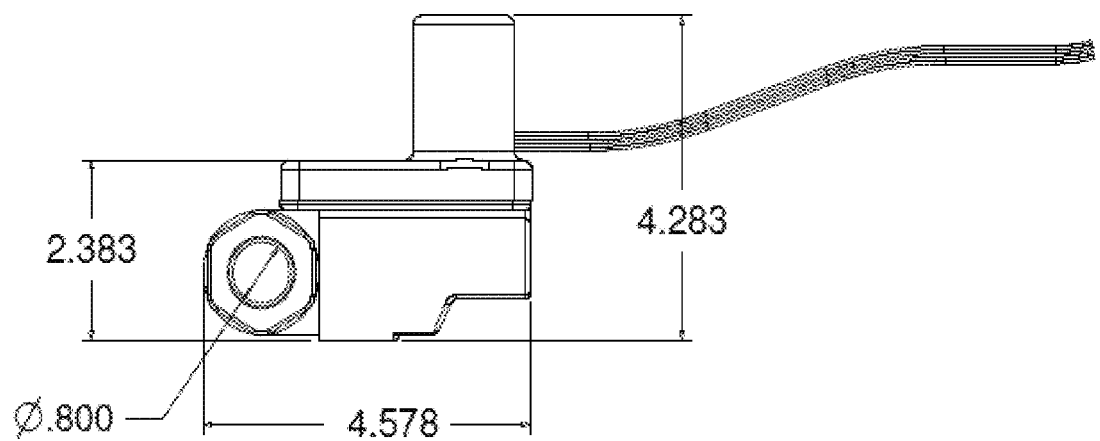

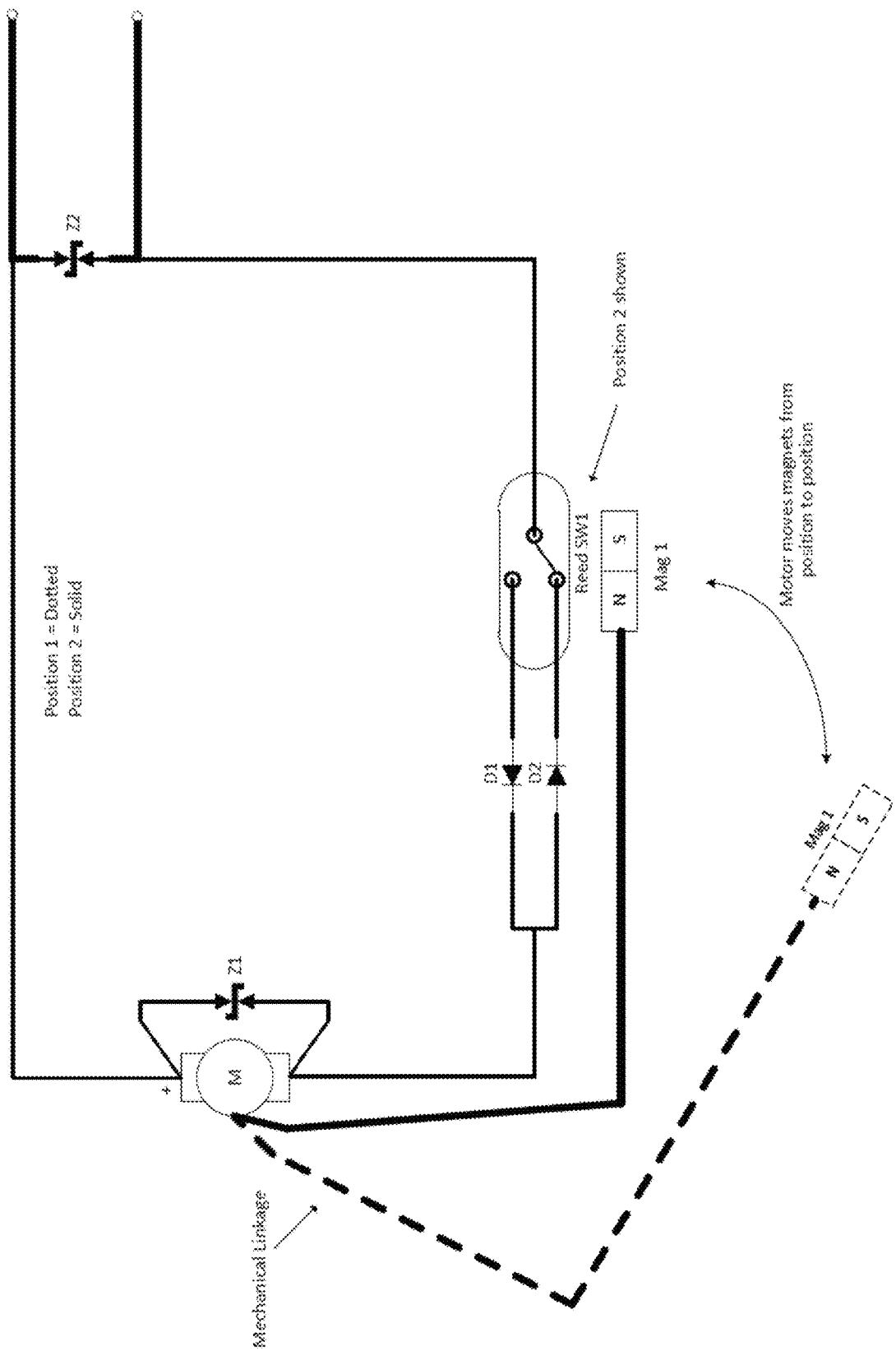

Basic elements: Membrane assembly

Edge examples: 90 Degree (view of fluid entry side of gate)

Edge examples: Radii & Chamfers

Notched sides: Fluid exit/ top side

Notched sides: Fluid entry/ bottom side

Gate extended into flow path, Valve closed

Gate retracted, Valve Open

Valve completely open

Regulating flow: Gate partially inserted into flow path

PRESSURE LOSS MITIGATION AND DURABLE VALVE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates to valves, including valves configured to control the flow of fluids.

Description of the Related Art

Agricultural and non-agricultural irrigation processes utilize valves to control fluids for the growth and management of plants, animals (including but not limited to livestock, fish, poultry), insects, and microbial agents (including but not limited to bacteria, fungus, viruses), products. These processes include irrigation, fertigation, chemigation, pest (e.g., animal, insect, viral, fungal, bacterial) control, weed control, cooling of crops and livestock and animals, dust control, and drinking. Additionally, industrial processes (non-agricultural) utilize valves for control of fluids that are and include feedstock (e.g., for bottled water) or where fluids control something (e.g., cooling, dust control).

However, conventional valves (e.g., solenoid piloted diaphragm and solenoid piloted globe valves) suffer from disadvantageous pressure loss, lack of reliability with both valve and valve automation and/or actuation components (e.g., solenoids, solenoid filters, hydraulic lines, diaphragms and elastomers, and other components that are damaged by water particulate [e.g., sand] and water chemistry issues such as hard water and high iron), and the expense and complexity of valve automation components, and are limited in their ability to cost effectively perform functions beyond simple On/Off control (e.g., control of and remote and/or manual adjustment of pressure and flow)

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a valve, such as low power valve that optionally includes a single seat interaction with a valve gate (wherein the gate is not easily hindered by entrapped debris (e.g., sand) suspended in the fluid). The gate is optionally impermeable, flexible and/or compressible (e.g., comprises of a polymer, such as fluoropolymer by way of nonlimiting example, which has relatively high chemical resistance and lubricity). The gate is optionally more flexible than the seat, which may optionally be a rigid metal or ceramic seat. Optionally, the gate is shaped to engender flow (e.g., pressure and/or flow rate) control via Bernoulli or other fluidic forces, optionally in concert with force modifying devices (e.g., springs, other tension or compression mechanisms, or the like) that can me manually and/or remotely controlled.

An aspect of the present disclosure relates to a valve, comprising: a housing having an exterior surface and an interior surface, the interior surface defining at least one chamber, the housing having: a fluid inlet comprising a first fluid inlet orifice configured to engage a first fluid conduit, wherein the fluid inlet comprises a second fluid inlet orifice, wherein the fluid inlet is configured to communicate fluid from the first fluid conduit via the first fluid inlet orifice to the second fluid inlet orifice, and from the second fluid inlet orifice to the chamber; a fluid outlet comprising a first fluid outlet orifice and a second fluid outlet orifice comprising a seat (optionally a rigid seat), the fluid outlet configured to engage a second fluid conduit via the first fluid outlet orifice, a movable gate, optionally shaped to cause a Bernoulli effect, that is flexible and compressible and impermeable, the movable gate having a first surface and a second surface, wherein the first surface is closer to the second fluid outlet orifice comprising the seat (e.g., the rigid seat) than the second surface, and wherein optionally the moveable gate is more flexible than the seat (e.g., the rigid seat) and wherein the moveable gate has a first planar surface and is optionally configured to slidably move in a first axis. Optionally, the movable gate is configured to be positioned so that the movable gate is located between the second fluid inlet orifice and the second fluid outlet orifice when the valve is in a closed position, wherein a fluid pressure within the chamber causes the movable gate to seal the second fluid outlet orifice via the seat, and not the second fluid inlet orifice, when the valve is in the closed position.

An aspect of the present disclosure relates to a valve, such as an irrigation valve, including: a housing having an exterior surface and an interior surface, the interior surface defining at least one chamber, the housing having: a fluid inlet defined by a fluid inlet wall, the fluid inlet wall defining a first fluid inlet orifice configured to engage a first fluid conduit, wherein optionally the fluid inlet wall does not extend into the chamber, and wherein the fluid inlet comprises a second fluid inlet orifice defined by the interior surface of the housing, wherein the fluid inlet is configured to communicate fluid from the first fluid conduit via the first fluid inlet orifice to the second fluid inlet orifice, and from the second fluid inlet orifice to the chamber; a fluid outlet defined by a fluid outlet wall and including a first fluid outlet orifice and a rigid second fluid outlet orifice, the fluid outlet wall configured to: engage a second fluid conduit via the first fluid outlet orifice, communicate fluid, via the rigid second fluid outlet orifice, from the chamber to the second fluid conduit; and a movable compressible and/or flexible, impermeable gate, shaped to cause a Bernoulli effect, having a first surface and a second surface, wherein the first surface is closer to the rigid second fluid outlet orifice than the second surface and wherein the movable compressible and/or flexible, impermeable gate is more flexible than the rigid second fluid outlet orifice, wherein the moveable compressible and/or flexible, impermeable gate has a first planar surface and is configured to slidably move in a first axis, and wherein the movable compressible and/or flexible, impermeable gate is configured to be positioned so that the movable compressible and/or flexible, impermeable gate is located between the second fluid inlet orifice and the rigid second fluid outlet orifice when the irrigation valve is in a closed position, and wherein a fluid pressure within the chamber causes the movable compressible, impermeable gate to seal the rigid second fluid outlet orifice, and not the second fluid inlet orifice, when the valve is in the closed position, and wherein the movable compressible and/or flexible, impermeable gate is configured to move along a path.

Optionally, the valve is configured to partially open or partially close to modify flow rates of fluid flowing through the valve from the fluid inlet to the fluid outlet. Optionally, the valve is configured to partially open or partially close to modify fluid pressure. Optionally, the gate consists of a single component. Optionally, the gate comprises a fluoropolymer and/or polytetrafluoroethylene, or a similar impermeable lubricious material. Optionally, the gate comprises a flexible, compressible membrane and a rigid substrate. Optionally, the second fluid outlet comprises a rigid stainless steel seat. Optionally, the gate shaped to cause the Bernoulli effect has a leading edge shaped so that the Bernoulli effect reduces the force needed to mobilize the gate. Optionally, the gate shaped to cause the Bernoulli effect is shaped so that the Bernoulli effect is configured to enable valve flow rates to be controlled by pulling the gate further into a flow path (by fluid forces such as the Bernoulli effect) as a flow rate increases or allows the gate to be pulled back away (optionally aided by a tensioner or compression device) from the flow path when the flow rate decreases. Optionally, the gate shaped to cause the Bernoulli effect is shaped so that the Bernoulli effect is configured to enhance positional tolerance of the gate. Optionally, the gate shaped to cause the Bernoulli effect is shaped so that the Bernoulli effect is configured to control valve pressure. Optionally, the valve comprises one or more fluid venting ports. Optionally, only a first side of the gate comes into contact with a valve seat. Optionally, the valve comprises a single valve seat. Optionally, the valve comprises at least two valve seats. Optionally, the valve is configured to autonomously position the gate so as to reduce a fluid flow rate at least partly in response to the fluid flow rate exceeding a first threshold, and to autonomously position the gate so as to increase a fluid flow rate at least partly in response to the fluid flow rate following below a second threshold.

An aspect of the present disclosure relates to a valve, including: a housing having an exterior surface and an interior surface, the interior surface defining at least one chamber, the housing having: a fluid inlet defined by a fluid inlet wall, the fluid inlet wall defining a first fluid inlet orifice configured to engage a first fluid conduit, wherein the fluid inlet comprises a second fluid inlet orifice defined by the interior surface of the housing, wherein the fluid inlet is configured to communicate fluid from the first fluid conduit via the first fluid inlet orifice to the second fluid inlet orifice, and from the second fluid inlet orifice to the chamber; a fluid outlet defined by a fluid outlet wall and including a first fluid outlet orifice and a second fluid outlet orifice including a rigid seat, the fluid outlet wall configured to: to engage a second fluid conduit via the first fluid outlet orifice, a movable gate, shaped to cause a Bernoulli effect, that is compressible and/or flexible, and impermeable, the movable gate having a first surface and a second surface, wherein the first surface is closer to the second fluid outlet orifice including the rigid seat than the second surface, and wherein the moveable gate is more flexible than the rigid seat and wherein the moveable gate has a first planar surface and is configured to slidably move in a first axis, wherein the movable gate, that is flexible and/or compressible and impermeable, is configured to be positioned so that the movable gate is located between the second fluid inlet orifice and the second fluid outlet orifice when the valve is in a closed position, and wherein a fluid pressure within the chamber causes the movable gate, that is flexible and/or compressible and impermeable, to seal the second fluid outlet orifice via the rigid seat, and not the second fluid inlet orifice, when the valve is in the closed position, and wherein the movable gate, that is flexible and/or compressible and impermeable, is configured to move along a path.

Optionally, the valve is configured to partially open or partially close to modify flow rates of fluid flowing through the valve from the fluid inlet to the fluid outlet. Optionally, valve is configured to partially open or partially close to modify fluid pressure. Optionally, the gate consists of a single component. Optionally, the gate comprises a flexible, compressible membrane and a rigid substrate. Optionally, the rigid seat comprises stainless steel. Optionally, the gate shaped to cause the Bernoulli effect is shaped so that the Bernoulli effect is configured to reduce the force needed to mobilize the gate. Optionally, the gate shaped to cause the Bernoulli effect is shaped so that the Bernoulli effect is configured to control valve flow rates. Optionally, the gate shaped to cause the Bernoulli effect is shaped so that the Bernoulli effect is configured to enhance positional tolerance of the gate. Optionally, the gate shaped to cause the Bernoulli effect is shaped so that the Bernoulli effect is configured to control valve pressure. Optionally, only a first side of the gate comes into contact with a valve seat. Optionally, the irrigation valve comprises a single valve seat. Optionally, the valve comprises two or more valve seats. Optionally, the valve is configured to autonomously position the gate so as to reduce a fluid flow rate at least partly in response to the fluid flow rate exceeding a first threshold, and to autonomously position the gate so as to increase a fluid flow rate at least partly in response to the fluid flow rate following below a second threshold.

BRIEF DESCRIPTION OF THE DRAWINGS

Configurations will now be described with reference to the drawings summarized below. Throughout the drawings, reference numbers may be re-used to indicate correspondence between referenced elements. The drawings are provided to illustrate example configurations described herein and are not intended to limit the scope of the disclosure.

FIG. 2 illustrates an example electric circuit for a 2-way and 3-way fluid valve.

DETAILED DESCRIPTION

Figure 1A:
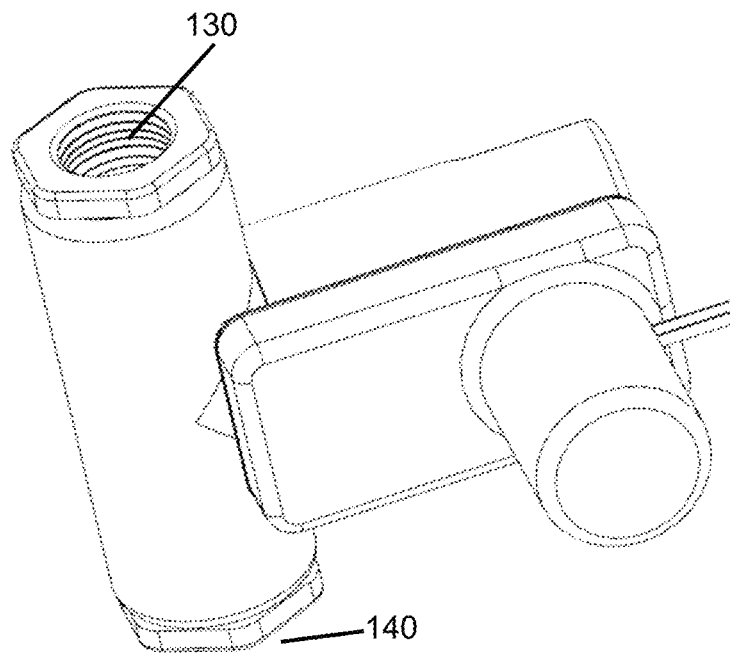
FIGS. 1A-1P illustrate various aspects of an example 2-way fluid valve.
Figure 1B:
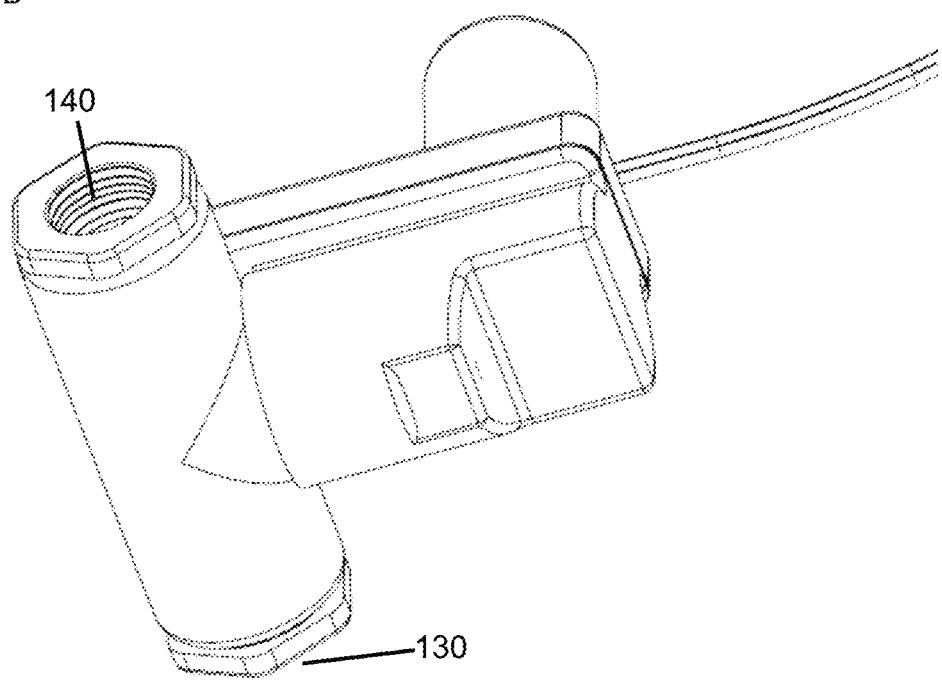

An aspect of the present disclosure relates to an enhanced valve that provides reduced pressure drop, higher reliability, and/or greater breadth of functionality (e.g., remote and manual adjustment of pressure and/or flow rate), lower cost than conventional valves. Further, such enhanced valve may optionally have a reduced need for high tolerance components for positioning a gate over a valve seat, may optionally be more tolerant of debris [e.g., sand, microbial life and other organic and inorganic debris in well water and surface water], may optionally be autonomously operated by tensioning devices (e.g., springs) or other compression device without requiring or in concert with a motor, may optionally utilize a single seat valve, may optionally utilize a gate where only one side of the gate comes in contact with a valve seat, may optionally utilize a flexible gate to seal a rigid valve seat, may optionally be configured to utilize gates of different thicknesses without negatively affecting the interface of the gate and valve seat, may optionally require less power than a conventional motor-operated valve (e.g., motorized gate valve). Optionally, this includes fitting any example valves with a variety of different gate shapes configured to perform certain functions described herein.

By way of example, such gates may optionally be configured to provide some or all of the following functions:
- enhance, maximize, minimize, reduce, produce, and/or influence a Bernoulli effect that reduces, modifies or otherwise influences forces used to move the gate, and/or
- produce forces that moves and/or positions the gate (e.g., by harnessing fluidic forces which enable valve flow rates and/or valve pressure to be modified and/or controlled, and/or enable looser positional tolerance of the gate).

Such novel gate shapes are optionally configured to interact with fluid as it flows through the valve to produce advantageous force, power, and/or positioning effects, with:
- motorized and/or non-electric valves, and/or
- with gates that are positioned with or without motors and/or
- in concert with tensioning and/or compression devices.

Thus, certain of the disclosed valve configurations may provide some or all of the following advantages:
- relatively low power requirements for motor or tension/compression device operation (e.g., due in part to having only one valve seat and/or the gate shaped in certain configurations);
- relatively-low tolerance requirements (e.g., due to the use of a single valve seat in certain configurations that does not require exact gate placement against the valve seat and where the gate only seals and/or interfaces with the valve seat and/or seat surface when fluid pressure pushes a gate against valve seat);
- durable (e.g., due to the use of a single valve seat in certain configurations that does not or minimizes entrapment of debris and, that when water pressure disappears, the valve seat seal and/or interface with the gate disengages thereby preventing or minimizing freeze damage, a leading cause of valve failure in irrigation);
- throttle flow with low power requirements (e.g., versus a conventional, double seated gate or ball valves), with the aid of engineered design of fluid-contact surfaces (e.g., gate shape) located inside the valve.

Certain of the foregoing advantages enable different enhanced valve configurations, including one or more of the following and other configurations:
- a motorized On/Off valve (where the valve may be fully open or fully closed and that does not provide for partial throttling) that utilizes low amounts of power (e.g., via the utilization of a thin gate, optionally configured with side notches and/or radiuses in strategic places);
- a motorized On/Off throttling valve (that may be fully or partially opened/closed) that utilizes low amounts of power (e.g., via the utilization of a thin gate, optionally with gate designs that provide enhanced throttle setting resolutions);
- a non-motorized (manually adjusted) flow regulating valve that has gate design that is pulled into the flow path (e.g., by Bernoulli forces) as flow rates increase and is retracted out of the flow path by a spring or other tension/compression device when the flow rate decreases.

Fluid valves regulate, direct, or control flow of fluids by opening, closing, or partially obstructing passageways. As used herein, the term "fluid" may include, by way of example, agricultural, non-agricultural, scientific, industrial, animal (including but not limited to livestock, fish, poultry), insect, and microbial (including but not limited to bacteria, fungus, viruses, algae, and the like), and drinkable fluids, aqueous solutions, gases, liquids, fluidized solids, and slurries, and fluids to manage processes involving any of the above.

A representative valve in agricultural and industrial applications is a "control valve" which switches fluid flow "On" or "Off". Such valves may be two or three-way diaphragm valves, piston valves, globe valves, or solenoid valves. By way of further illustration, a valve may be a gate valve, a ball valve, a diaphragm valve, a globe valve, a piston valve, a plug valve, a knife valve, a curtain valve, a pinch valve, or a slide valve. Such valves may optionally be configured to be manually operated and/or automated with electric and/or hydraulic pilots (e.g., a solenoid valve). Control valves can be modified into "flow control valves" which introduce pressure loss, or other forces, to modify fluid flow rates. Herein, control and flow-control valves may be referred to singularly as a "valve" or in the plural as 'valves".

Valve design is dictated by several factors, including cost and function. Automated, low cost valves (e.g., such as a diaphragm valve) are typically designed for a single function such as On-OFF fluid control or automated pressure/flow regulation at a single setting (i.e., not capable of remotely adjusting flow). Additional functions that, for example remotely adjust the pressure and/or flow rates downstream and/or upstream of the valve conventionally require costly engineering features and/or components such as larger or highly engineered valve pilots with flow passages and increased need for positional tolerance. As an example, ball and gate valves, which have may have ultra-low-pressure losses, conventionally require costly automation systems, such as high-power motors because of the higher friction from two valve seats and/or continuous seat contact with channels and guides for the valve's sealing elements and processes. By way of further example, conventional valves (e.g., ball valves, gate valves, globe valves) require tight tolerances in the components that direct, guide, and mobilize the valve's closure elements in order to keep the gate/seat seal in the appropriate position to enable a full seal and/or a sufficient seal that allows flow control.

In contrast to such conventional valves, an aspect of the present disclosure relates to low cost, optionally with single seats (although two or more valve seats may be utilized), where the single seat is in controlled intermittent contact with sealing elements, such as a valve seat and/or valve seat surface. Advantageously, certain disclosed valves can optionally be automated and/or actuated at relatively low cost using inexpensive pilots such as, by way of example, low power motors (e.g., non-stepper motors), gear motors and/or solenoids, with or without the aid of tensioning and/or compression devices. Optionally, such valves may be configured to have either extremely low pressure loss when fully open, and/or may be configured to intentionally introduce pressure loss when in a partially closed state.

Fluid pressure-loss or friction loss ("pressure loss" or "loss") describes pressure drop between where a fluid enters a system or component (e.g., a valve) and exits. Pressure loss is a complex function of flow-path geometry, fluid properties, and flow rate. Flow through a valve produces flow patterns that are a combination of laminar, turbulent or transitional flow as described by Osborne Reynolds (who the Reynolds number (Re), which is used to predict flow patterns in different fluid flow situations, is named after). Laminar flow is described as "orderly" whereas turbulent flow is "chaotic" and leads to the greatest pressure losses. In inexpensive valves, pressure loss is a widespread problem due to minimal laminar flow capabilities. For example, conventional ¾" diaphragm-type and globe-type control valves can produce pressure losses as high as 5-10 psi at flow rates of 25 gallons per minute (gpm) when in the fully open state Valves of many sizes, typically ⅛" to 3" in diameter, are used in industrial systems, agricultural systems, and other systems and applications disclosed herein. An example agricultural irrigation system is a center pivot machine employing, by way of illustrative example, 1-150 sprinklers across approximately 1,000-2,000 feet of 3-10" diameter pipe spans, rotating around a fixed point. Sprinklers closest to the center may deliver fluids at 0.01-3.0 gpm, whereas outer sprinklers may deliver fluids at rates at 5-20 gpm. Valves are used in pivot applications, including and optionally, ¾" valves for control of sprinklers including to prevent and/or manage fluid runoff or groundwater pollution in areas of the field where less fluid is needed, directional spraying to keep fluid off of hardware (e.g., pivot towers and tires), and "end guns" where fluid is sprayed beyond the end of the pivot.

Pressure loss is an important consideration in most valve applications for the reasons including:
a. Fluid systems generally should run at lowest practical pressures for a given application to save pumping energy. Lost pressure requires greater and costlier fluid pressures and larger pumps.
b. Pressure is needed to deliver sufficient fluid flow rates and amounts. Inadequate pressure, and therefore inadequate flow, results in agricultural, industrial, and other processes receiving inadequate fluids.
c. Pressure is needed to deliver sufficient area coverage or sprinkler "throw". Inadequate pressure means the distance fluid travels, once ejected from a sprinkler or other orifice, is reduced and therefore fluid coverage is reduced. Other coverage issues may arise in industrial applications, as in mining or cattle applications, where dust control is achieved via sprinklers.

In contrast to the conventional valves discussed above, disclosed herein are valves with low-pressure loss, optionally and in the case of an example configuration of a ¾" valve, producing less than 2-5 psi pressure loss at a flow rate of 25 gpm. The disclosed valves may optionally be configured to deliver various levels of pressure loss in order to function as flow control valves. Disclosed are multiple example designs with one or more impermeable, compressible and/or flexible and/or stretchable membranes attached to a rigid membrane support and assembly that slides, rolls, spins, rotates, swings, repositions, creeps, falls, settles, flows, spread, and/or flips over and seals to a rigid valve seat.

Optionally, structures comprising a membrane (e.g., an impermeable and/or compressible and/or flexible and/or stretchable membrane) mounted or otherwise positioned on a membrane support structure (e.g., a rigid membrane support structure) may be utilized as a gate in a gate valve. Further disclosed are unitary structures configured to act as a gate in a gate valve (e.g., where a single impermeable structure that is flexible, compressible and impermeable is utilized as a gate, without having a separate impermeable membrane positioned and/or attached and/or affixed to a membrane support structure).

Certain features described herein enhance the provision of variable rate irrigation and/or variable rate chemigation and/or variable rate fertigation, which may be collectively referred to herein "VRI" and/or precision irrigation. Such features enable irrigators to apply variable and specific amounts of items including fluids, water, chemicals, and fertilizer to discrete sections of irrigated fields. Such features may also be referred to as "precision irrigation" features, a term also used for such processes in the agricultural literature.

Conventional VRI-amendable irrigation equipment are generally classified as center pivot, linear move, stationary solid set sprinkler lines, or wheel lines. While certain configurations disclosed herein relate to and may be utilized with such irrigation equipment, as well as other fluid handling and sprinkling systems that may be utilized in agriculture, the disclosed configuration may be utilized other forms of irrigation and applications. For example, certain disclosed configurations may be utilized in applications such as home, garden, and institutional, and non-agricultural water handling and processing. Thus, although the valves and valve mechanisms and components described herein may be discussed in the context of center pivot irrigation, the utilization of the valves and valve mechanisms and components are not so limited.

While center-pivot irrigation systems may be sized to irrigate fields of virtually any size, typically they are sized to irrigate square fields of 160 acres with, with 3-9 movable towers supporting laterals having a typical total of 100 to 150 sprinkler assemblies, each of which may be controlled by a single valve. In other cases, one valve may control several sprinklers in a zone. VRI irrigation provides certain irrigation advantages because uniform water application is rarely an efficient practice across large plots of field, especially fields with variable soil characteristics such as variable chemistry and variable physical attributes of structure, porosity, intrusion rates, etc.

Large irrigated agricultural fields (e.g., greater than 25 acres) present varying soil types, topography, soil depth, fertility, and insect and weed population density, all of which, or in part or in addition to other factors, determine a field's "spatial variability". One portion of the field may contain thin sandy soil with low water holding capacity from which water drains easily. Another portion of the field, usually at the bottom of drainage, may contain a deeper sand, clay and silt mixture, which drains slowly and holds fluids, water, and chemicals for longer periods of time. In such cases, conventionally the farmer is faced with too little fluid and/or water in one portion of the field and too much at the other. Without VRI, farmers conventionally irrigate an entire field at the rate required for the most water deficient soil in the field, wasting water in areas having low capacity soil and where leaching of nutrients (among other things) occurs. This results in over application of fluids (e.g., water, chemicals, fertilizer), which in turn results in wasted water and fluids as well as in a significant increase in pollution (e.g., leaching of chemicals, fertilizer and other objectionable substances into groundwater).

By contrast, VRI may utilize hardware (e.g., valves and/or computers and/or microcontroller and/or microprocessors boards, such as the RasberryPi or Arduino boards) and programs and/or state machines to determine fluid and water application rates and/or patterns. For example, fluid and water application rates and/or patterns may be determined using data gathered from local and remote sensors (e.g., moisture content, soil temperature, and salinity sensors positioned at one or more depths), as well as satellites to generate data including topography, soil maps for moisture retention and runoff likelihood, yield predictions, plant respiration and stress. Using some or all of this data, VRI users and systems can more precisely apply water, fertilizer and chemicals, which saves input costs and conserves the environment (e.g., less groundwater pollution).

One VRI technique controls sprinklers individually or in groups (sometimes referred to as zones) using valves. For example, valves may be rapidly pulsed (1-60 Hz) On/Off or employed in partial On/Off positions using software and/or algorithms to change fluid and/or water application depth within individual zones. VRI can be achieved with discrete or continuous modification of valve open and/or closed states such that the valve is fully open or partially open and/or alternated with fully closed states as well as in any combination of said states. Optionally, a single wire, a two wire or multiwire system may be utilized to control individual or multiple valves.

In the example configurations illustrated in FIGS. 1A-4K, certain valves in combination with certain valve gates are depicted that may be utilized in conjunctions with structures, mechanisms, and controls disclosed in U.S. Pat. No. 10,927,962, filed Aug. 20, 2020, titled "PRESSURE LOSS MITIGATION AND DURABLE VALVE", incorporated herein by reference in its entirety.

The figures, descriptions, and dimensions provided herein describe example valve configurations with example mechanisms to connect to fluid conveyance systems (e.g., a ¾" valve with ¾" threaded connections, slip connections, or other connections), in the inlets and outlets as well as a fluid flow path (e.g., a nominal ¾" diameter flow path).

The disclosed valves may have any flow path geometry cross section and/or combinations thereof, including circular, oval, square, rectangle and hexagon. Advantageously, the disclosed valve designs are adaptable to various valve sizes (e.g., ranging from 1/64" to 10 meters in diameter). The disclosed shapes, dimensions, and ratios of dimensions (e.g., ratio of membrane 303 surface area to overall valve size) may vary within an individual valve size to accommodate and modulate valve construction, material properties, cost of production, reliability, as well as valve functions including open/close speed, flow rate modifications or control, resistance to debris accumulation, resistance to abrasion or chemical attack, positional tolerance of gate vs flow control capabilities, tolerances in general, and control by an electronic controller or manual means.

As discussed herein, with reference to FIGS. 1A-1P, 3A-3B, 4A-4K, (and as similarly discussed in U.S. Pat. No. 10,927,962, filed Aug. 20, 2020, titled "PRESSURE LOSS MITIGATION AND DURABLE VALVE", incorporated herein by reference in its entirety), optionally and collectively, the membrane assembly 300 the membrane 303 (e.g., an impermeable and/or a compressible and/or flexible and/or stretchable membrane) and/or membrane support 312 may be grouped together and referred to as the "gate" 340, as in FIGS. 4A-4K. Optionally, as discussed herein, the gate 340 may be a unitary structure of essentially the same material, of the gate 340 may be comprised of two or more separate parts and/or two or more different materials. In certain instances, the gate 340 refers to an impermeable compressible, sealing element that mates with the valve seat assembly 100 and/or valve seat surface 101 to either close off flow completely or partially, or otherwise modify flow. Optionally, one or both of the gate 340 and the valve seat surface 101 are completely flat, or one or both of the gate 340 and the valve seat surface 101 is nominally or approximately flat (with or without minor or major surface imperfections) that enable the valve to function appropriately.

By way of example, optionally an assembly may include a backing plate and a membrane mounted to the backing plate. By way of further example, optionally instead, a gate may consist of an impermeable single structure and material, such as a single sheet of polytetrafluoroethylene and/or another fluoropolymer or blends of fluoropolymers or other impermeable compressible and/or flexible materials.

Although reference may be made to the use of specific materials, and although such materials may have certain advantages, such as those discussed herein, the valve components may be made from any suitable material (e.g., Polyvinyl chloride, ceramics, epoxies, polymers, polymer cements, cements, fabrics, metals, plastics, rubbers, thermoplastics, thermosets, fluoroelastomers, fluoropolymers, thermoset elastomers, silicone, iron, steel, or combinations of any of the foregoing and/or blends (blends of polyphenylene oxides or polyphenylene ether resins with polystyrene) and/or laminates and/or derivatives of said materials, treated materials (e.g., galvanized steel or powder coated metals) discussed herein and/or materials disclosed in U.S. Pat. No. 10,927,962, filed Aug. 20, 2020, titled "PRESSURE LOSS MITIGATION AND DURABLE VALVE", incorporated herein by reference in its entirety, and/or other materials.

Materials selection may be based on one or more criteria, such as cost, and/or resistance to chemical attack, strength, and/or resilience and/or durability with respect to the impact from fluid particles. A filler, such as, by way of example, glass and/or carbon (or other filler), may be added to the materials to assist with mechanical and other material properties to enhance durability, strength and/or modify other structural properties. Thus, for example, part of or an entire membrane assembly and/or membrane (e.g., an impermeable and/or compressible and/or flexible and/or stretchable membrane) and/or valve seat assembly and/or gate and/or seal materials may, in addition to or instead of the materials described above and in U.S. Pat. No. 10,927,962, filed Aug. 20, 2020, titled "PRESSURE LOSS MITIGATION AND DURABLE VALVE", incorporated herein by reference in its entirety, be made of ceramics, metals, silicone, fluorosilicone, fluoro elastomer, natural rubbers polyisoprenes, butyls, ethylenepropylene, and/or fluoropolymers (PTFE and/or synthetic fluoropolymer of tetrafluoroethylene) and/or the like.

Optionally the membrane (e.g., an impermeable and/or compressible and/or flexible and/or stretchable membrane) and/or gate and/or seat may be made of the same material. Optionally, the membrane (e.g., an impermeable and/or compressible and/or flexible and/or stretchable membrane), gate, and membrane support may be made of the same material and be one continuous part without seams requirement for joining with adhesive or fasteners, such as any fluoropolymer formulation, and this may be paired with a stainless steel or fluoropolymer valve seat assembly 100 and/or seat surface 101 in the same valve.

As in configurations in FIGS. 1A-4K, any combination of suitable material(s) and their associated performance properties and/or physical properties and/or chemical properties may be used to form any valve component. Examples of performance properties include degrees of: hardness, rigidity, flexibility, compressibility, stretchability, permeability, impermeability, lubricity, and/or chemical resistance. Examples of physical properties may include degrees of: thickness, 3-dimensional and 2-dimensional shapes, radius, edges, perforations, lubricity, permeability, and/or other dimensions. Chemical properties include physical and chemical formulations and compoundings. Examples of materials are disclosed herein and in U.S. Pat. No. 10,927, 962, filed Aug. 20, 2020, titled "PRESSURE LOSS MITIGATION AND DURABLE VALVE", incorporated herein by reference in its entirety. Optionally any material described and/or employed in configurations herein and/or in U.S. Pat. No. 10,927,962 may be utilized or interchanged with any other design feature or configuration herein and/or in U.S. Pat. No. 10,927,962.

Optionally, the valve seat assembly, valve seat surface, impermeable membrane, and gate may have similar, identical, or dissimilar performance properties and/or physical properties and/or chemical properties but may perform, behave, and/or function similarly or identically. Optionally, the valve seat assembly, valve seat surface, membrane, and gate may have similar, identical, or dissimilar performance properties and/or physical properties and/or chemical properties and may perform dissimilarly. For example, an impermeable material such as Teflon (Polytetrafluoroethylene, PTFE or a synthetic fluoropolymer of tetrafluoroethylene) may be used both for the valve seat assembly, seat surface, and membrane, and gate, and the different materials may optionally have the same, similar, or different performance properties and/or physical properties and/or chemical properties.

FIGS. 1A-4K illustrate an example configuration including a sliding, reciprocating membrane assembly 300 carrying a membrane 303 (e.g., an impermeable and/or compressible and/or flexible and/or stretchable membrane) that may be positioned over a valve seat assembly 100 and/or valve seat surface 101 to cut off flow, partially cut-off or reduce flow or allow unhindered flow of the fluid (or other substance) when the membrane 303 and/or gate 340 is fully retracted into the valve chamber 211. The valve seat assembly 100 is positioned between an inlet 130 and an outlet 140 with a relatively straight flow path to minimize friction or pressure loss when the membrane 303 and/or gate 340 is fully retracted into chamber 211. However, the flow path may vary considerably to include non-straight flow paths, and/or deliver high or low pressure loss in the ranges of 0.1-30 psi loss at flow rates of 30 gpm, or lower or higher losses at lower or higher flow rates. Optionally, membrane 303 or the gate 340 can form a full or partial seal with the valve seat assembly 100 and/or seat surface 101 (see, e.g., FIG. 4K), while the valve is fully closed or partially open. The valve may leak or not leak when fully closed. Depending on the cost of the fluid being regulated by the valve, a valve that leaks slightly may be as effective from a practical standpoint (from a cost perspective) as a valve that fully seals without leaks.

Optionally, membrane 303 and/or gate 340 may be as thick, thicker, or less thick in cross section than the membrane assembly 300 and/or the valve seat 100 or seat mating surface 101. The membrane 303 may protrude outside of the membrane assembly 300 by the majority of its cross section to accommodate wear and compression of the membrane 303 and valve seat 100 or seat mating surface 101. and still maintain a full or partial seal with the seat surface to accommodate any one or combination of valve functions. Optionally, where the membrane 303 and membrane support 312 are made of the same material, such as a fluoropolymer formulation, they are one continuous part and therefore there may or may not have elevation differences.

The three-dimensional shape of the membrane 303 may be formed using a mold, with a 3D printer, computer controlled milling, lathing, and/or other technique to achieve complex three-dimensional and two-dimensional shapes, or extruded (e.g., where the membrane and/or gate material may be poured into a mold to set in a desired shape). As with other example designs, the membrane thickness may be 0.001" to 500" depending on overall valve size, and closer to 0.125" with a ¾" valve. Optionally, membrane 303 may be attached to the membrane assembly 300 with fasteners, adhesive by friction and/or press fit (without adhesive or fasteners) or by other means. Optionally, when the gate 340 is made of two materials, the backside of the membrane assembly 312 is opposite the side where the membrane 303 is attached or inserted. Fasteners may be applied to secure the membrane 303 through the backside 312 or through the side of the membrane assembly 300. Optionally, the membrane 303 may be attached to a rigid substrate, such as disclosed U.S. Pat. No. 10,927,962, filed Aug. 20, 2020, titled "PRESSURE LOSS MITIGATION AND DURABLE VALVE", incorporated herein by reference in its entirety, before it is attached to or placed inside of a recess of the membrane assembly 300.

The membrane assembly 300 and/or gate 340 may be solid or perforated (e.g., using circular holes or other shaped holes, where the perforations may extend partly or completely through the membrane assembly 300 or gate 340) to enable greater flexing, and/or stretching, and/or compression when the membrane 303 and/or gate 340 are in partial and/or full contact with the valve seat assembly 100 or valve seat surface 101. This membrane 303 may optionally sit inside a recess in the membrane assembly 300 where the majority of the membrane thickness is inside the recess. The shape of the membrane assembly recess around the membrane may or may not fully conform to the shape of the membrane. If placed inside a recess, the membrane base, opposite the seat mating surface, may have a non-flat surface that mates with a similar surface inside the membrane assembly, minimizing the need for fasteners and/or adhesives.

Optionally, membrane 303 and/or gate 340 (e.g., an impermeable and/or compressible and/or flexible and/or stretchable membrane) may be a composite and/or laminate of several materials. Optionally, the membrane assembly 300 and the membrane 303 or the gate 340 may be of one solid impermeable material (i.e., membrane 303 will be of the same material as the membrane assembly or membrane carrier 300), such as any fluoropolymer, Viton, PVC, rubber, ceramic, metal, or any material disclosed herein or in U.S. Pat. No. 10,927,962, filed Aug. 20, 2020, titled "PRESSURE LOSS MITIGATION AND DURABLE VALVE", incorporated herein by reference in its entirety. Optionally, portions of the membrane assembly, such as the end 331 that connects to linkage 510 (see, e.g., FIGS. 1H), may be of a different material than the rest of the membrane assembly 300 and/or the membrane 303 and/or the gate 340. Optionally, with a ¾" valve, the membrane assembly and/or gate may in some sections be relatively thin, or less than 4 mm (e.g., in the range of 0.1 mm-4 mm), sometimes in the range of 0.25-1 mm, especially when the membrane 303 and/or gate 340 is contiguous with the membrane assembly 300 such that both are made of the same material and both are the same object and/or both perform similar and/or different and/or complementary functions such as slowing down or closing down or shutting off the fluid flow through the valve.

The sealing side of the membrane 303 and/or sealing side 343 of the gate 340, that interfaces with seat assembly 100 or seat surface 101, may be flat or may employ a multitude of three-dimensional and/or two-dimensional shapes and/or the seat surface 101 may also be flat and/or have a multitude of similarly different shape varieties. For example, a planar or flat membrane may mate or interface to a flat or planar valve seat and/or seat surface, in a partially open or closed or fully open or fully closed valve state. In another example, a flat valve seat 100 and/or seat surface 101 may seal or otherwise interface and/or interact with a bent or other non-flat shaped membrane or gate which optionally is held in shape by laminate construction using a backing plate 320 or held by membrane assembly 300. Optionally, a flat membrane and/or gate may interface and/or interact with a non-flat valve seat or non-flat seat surface. Optionally, a single valve may be fitted with differently shaped and configured with single or multiple membranes, gates, or valve seat assemblies to vary flow rates or pressure loss when the valve is in various positions of closed, open, or intermediate.

Optionally, the seat 100 and/or seat surface 101 mating surface of the membrane 303 or gate 340 may by itself be a non-flat surface (e.g., convex or concave) without the assistance of a backing plate. The membrane 303 or gate 340 may optionally be a combination of flat surfaces on one side, for example the side that mates with the valve seat, with other three-dimensional shapes on the opposite side and/or other sides of the membrane support 312. Optionally, the gate-side 340, opposite of the sealing side, may be flat while the sealing side may be a wide variety of three-dimensional shapes to deliver varying flow characteristics, including and not limited to fluid flow rate and/or pressure. Optionally, the membrane 303 or gate 340 may have a series of perforations or holes in it to accommodate variable flow and pressure scenarios such as with variable rate irrigation. The holes enable the passage of fluids when the valve is in a closed or partially closed position and convert an otherwise impermeable material and structure into a partially permeable structure.

Figure 1C:
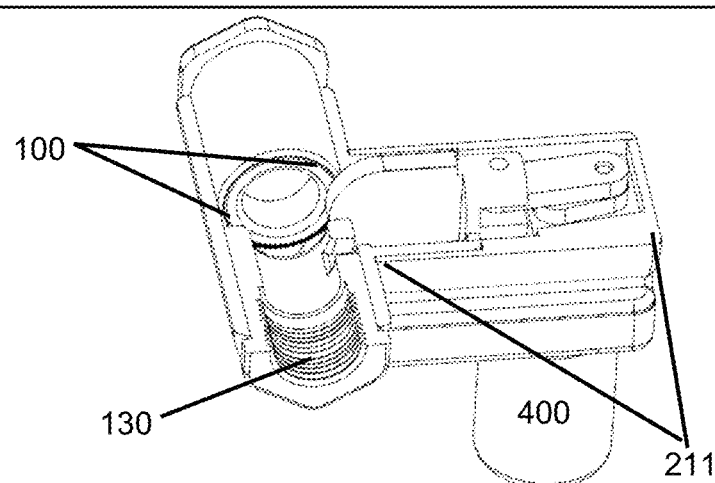
Figure 1D:
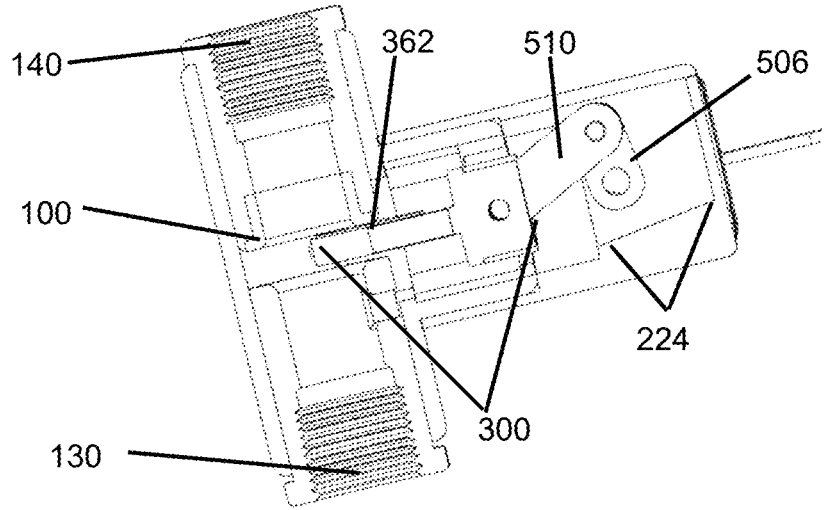
Figure 1E:
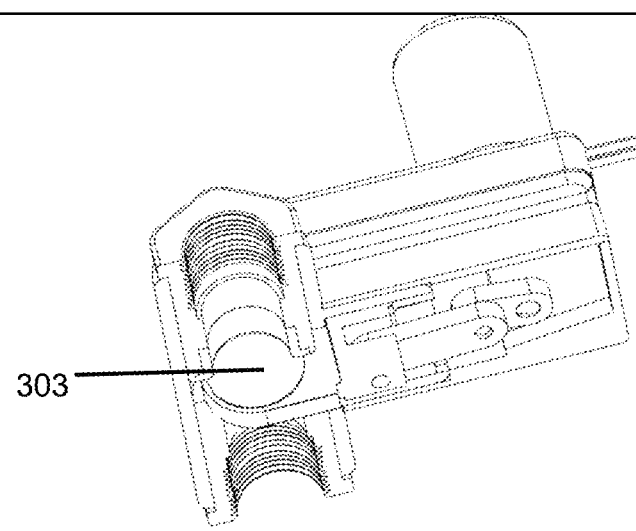
Figure 1F:
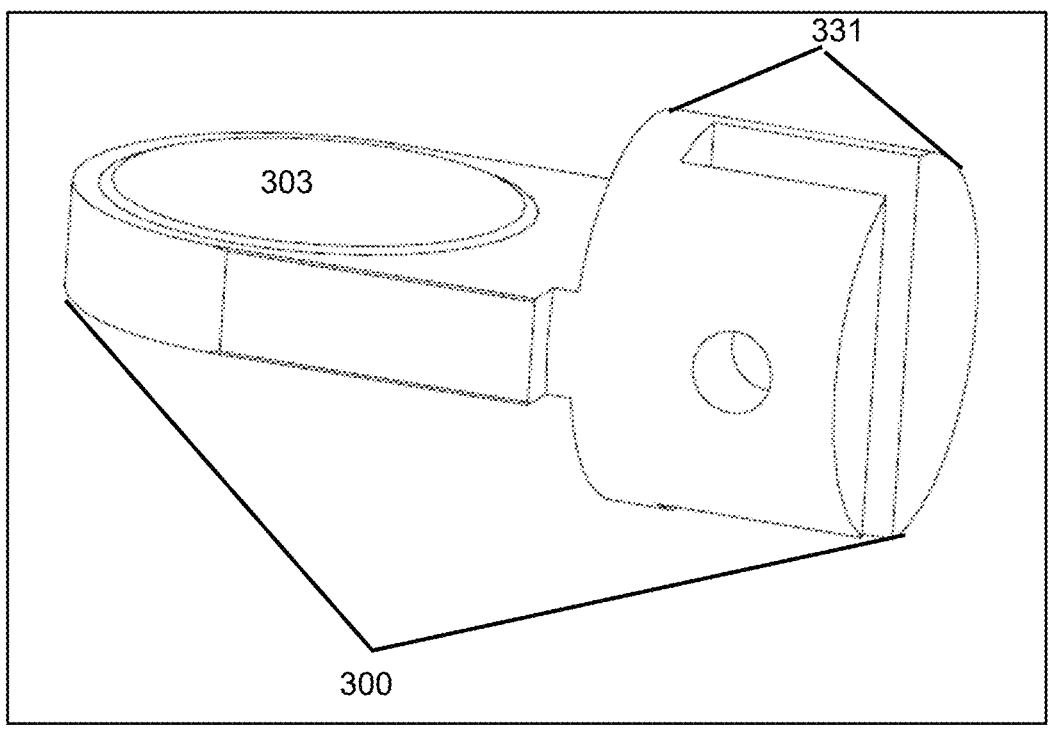
Figure 1G:
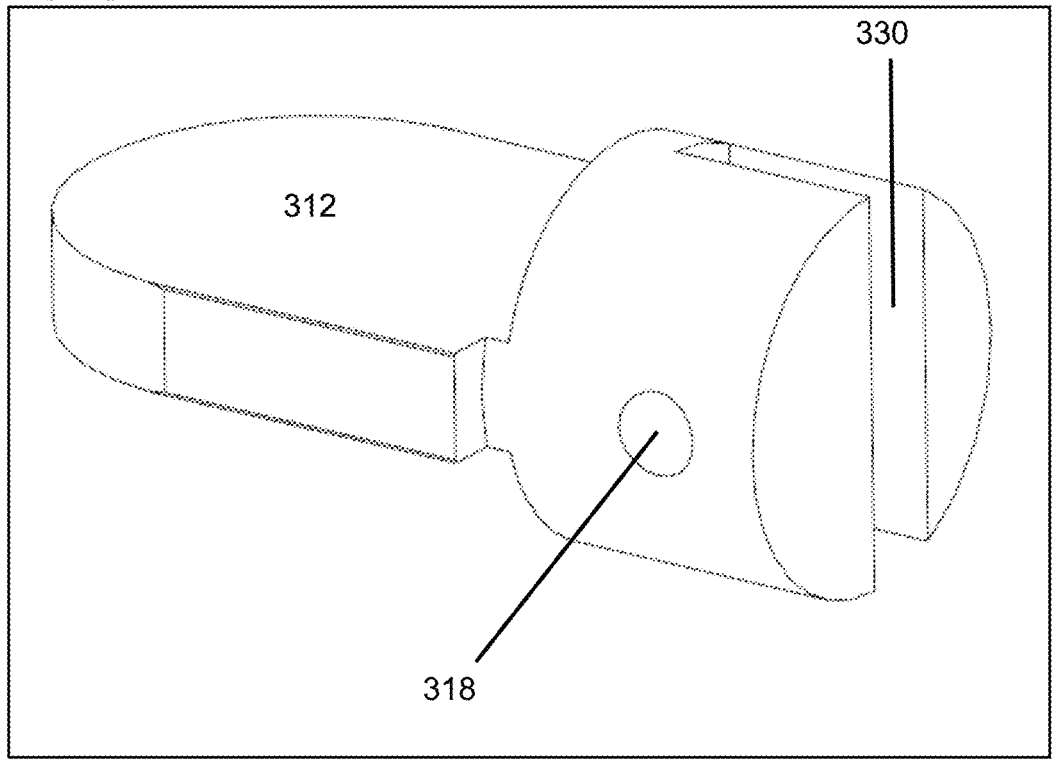
Figure 1H:
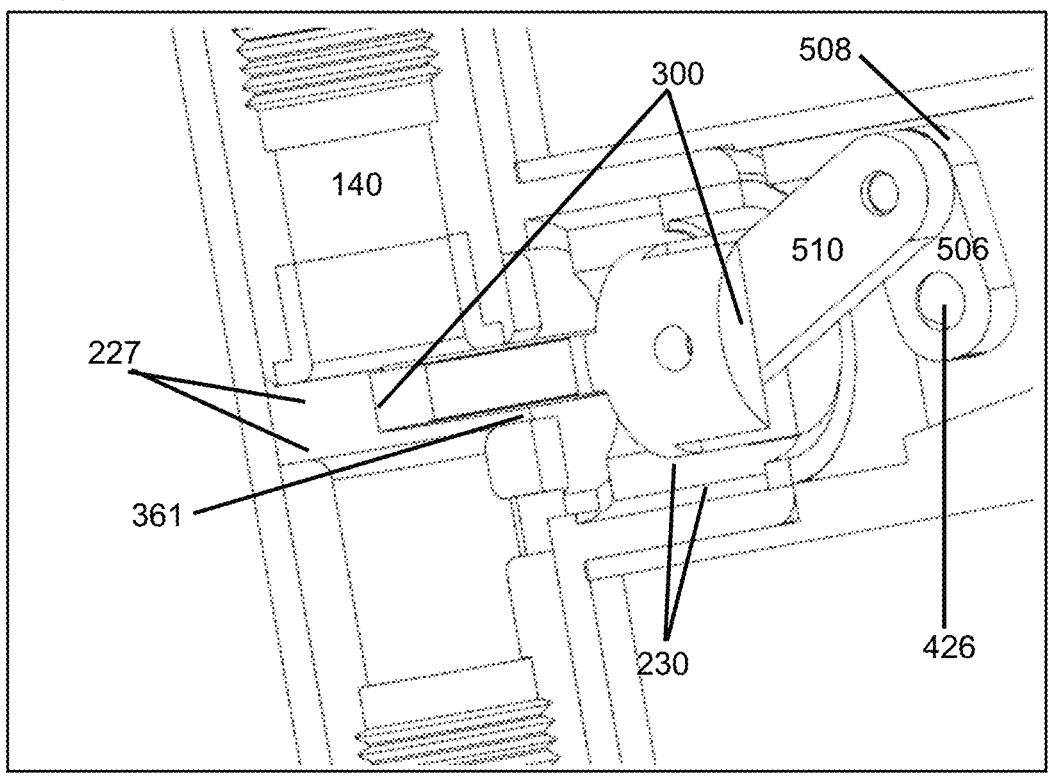
Figure 1I:
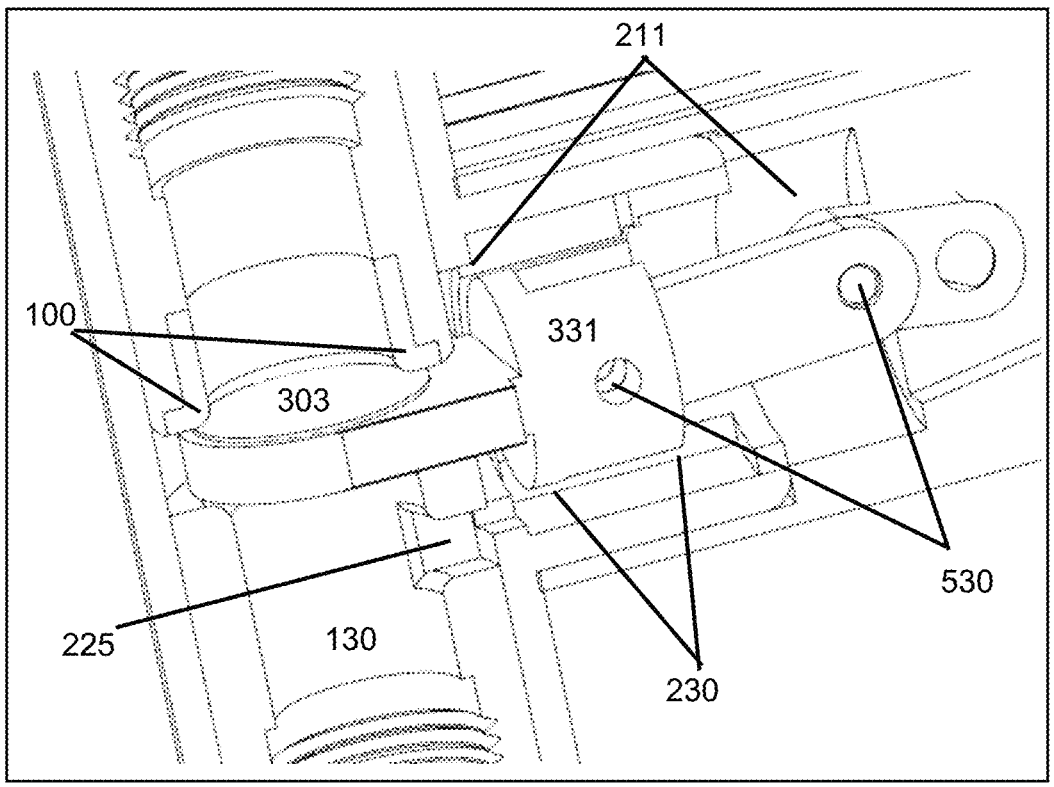
Figure 1J:
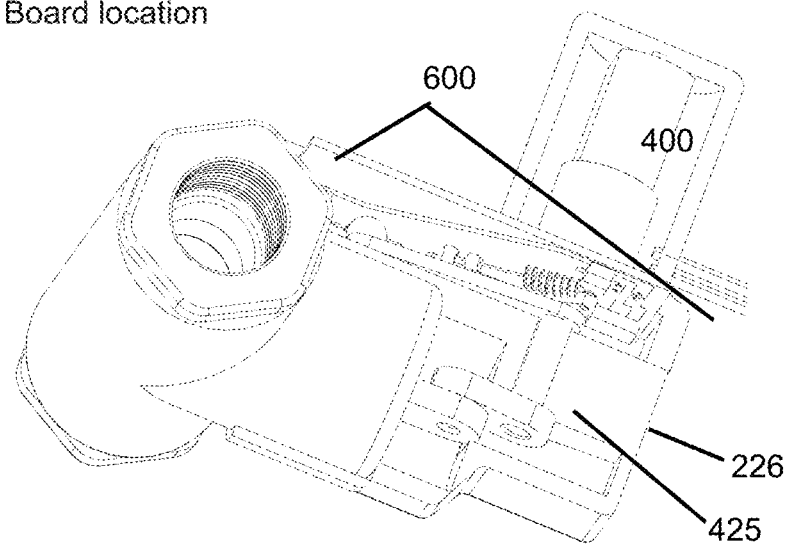
Figure 3A:
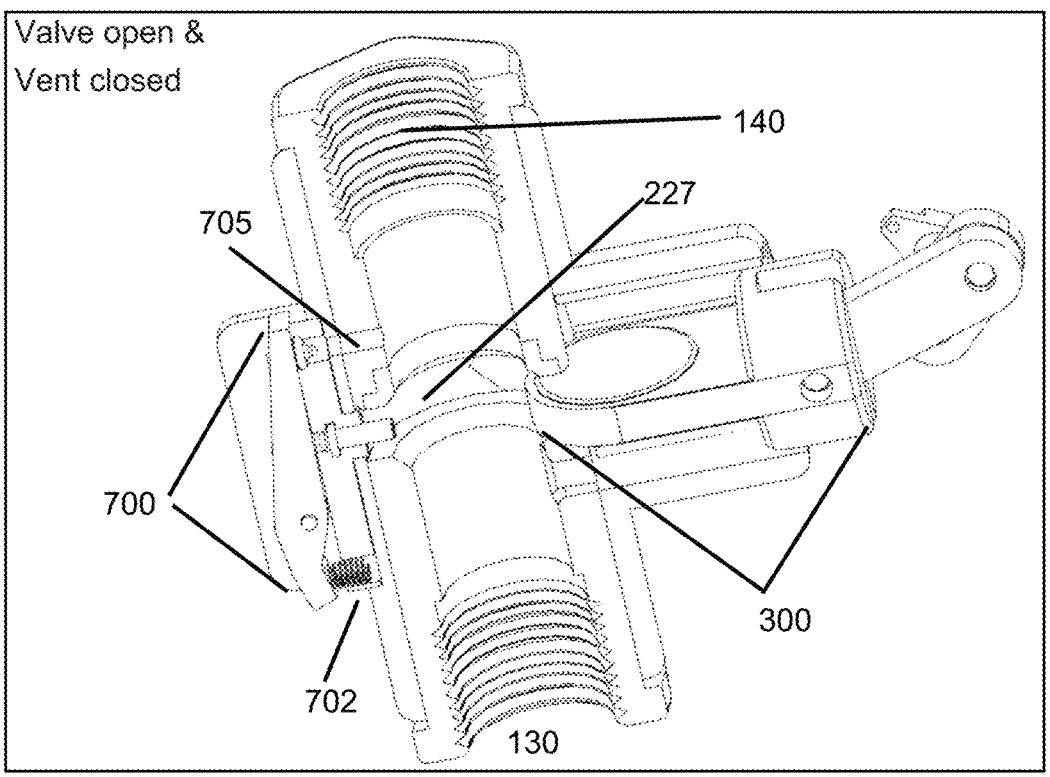
FIGS. 3A-3B illustrates various aspects of an example 3-way fluid valve.
Figure 3B:
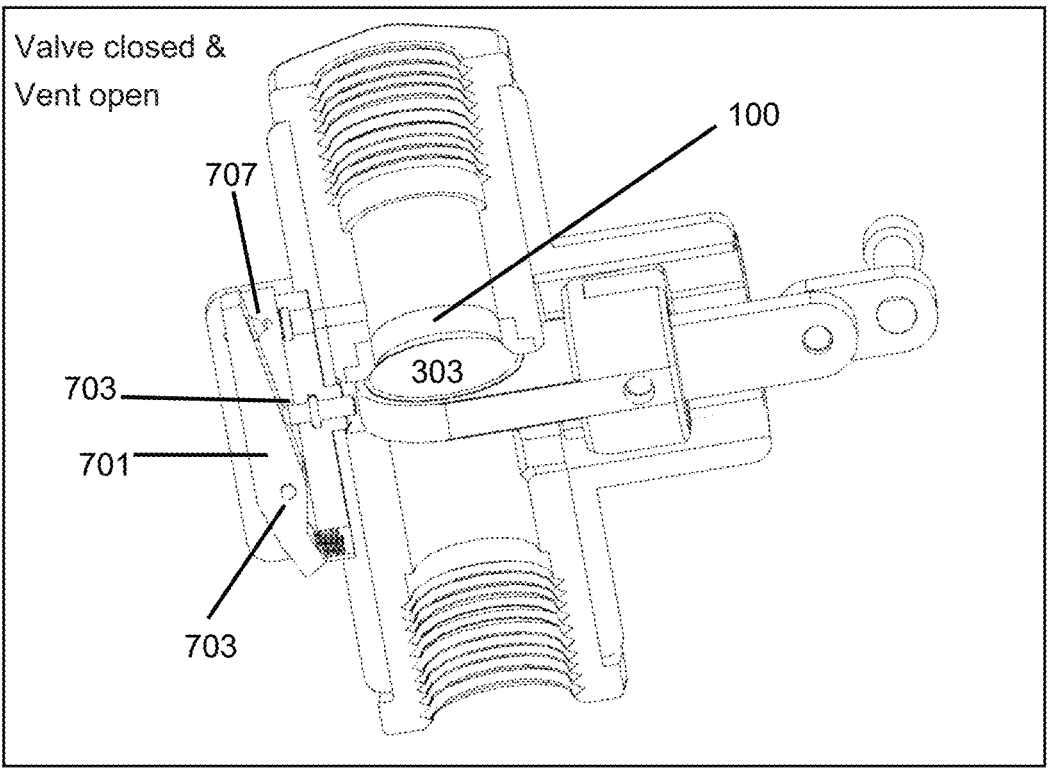
Figure 4A:
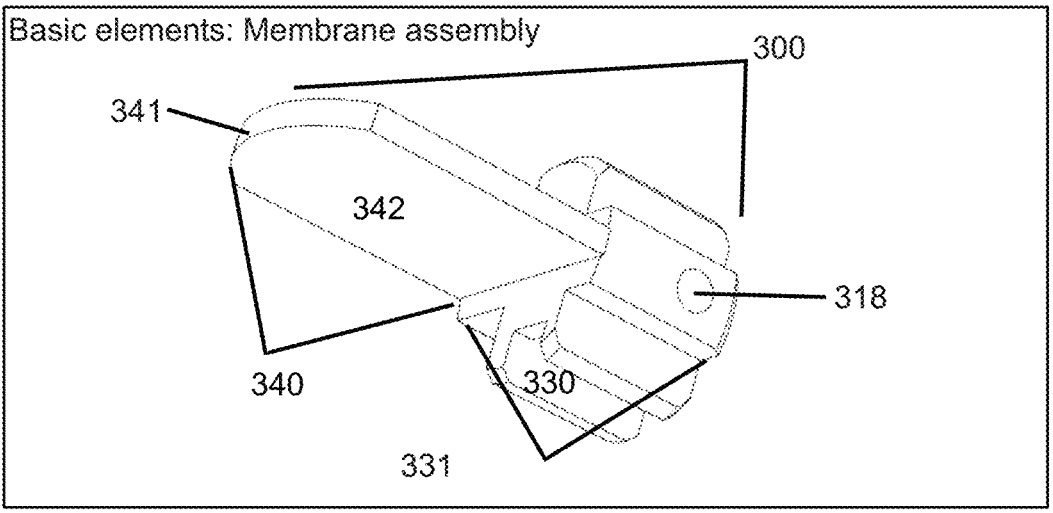
FIGS. 4A-4K illustrate various aspects of an example 2-way fluid valve and novel gate shapes.
Figure 4B:
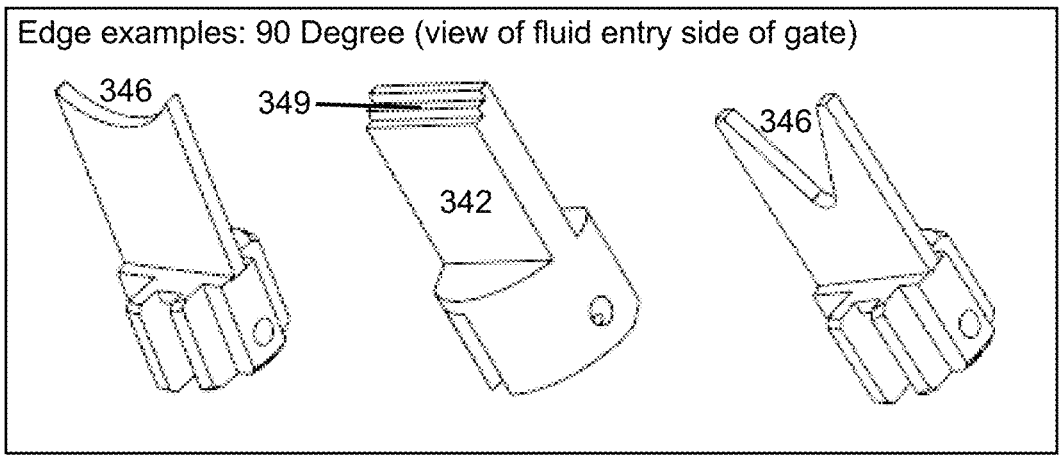
Figure 4C:
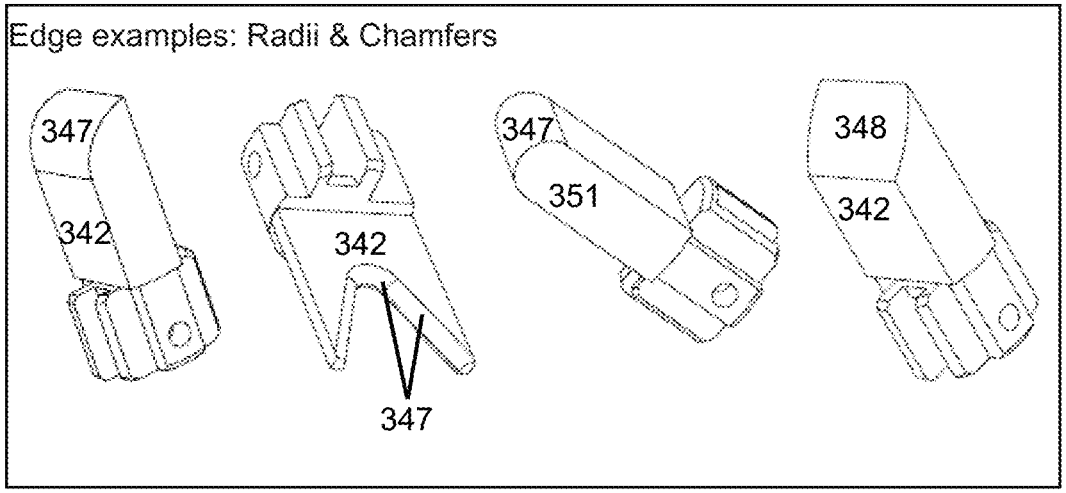
Figure 4D:
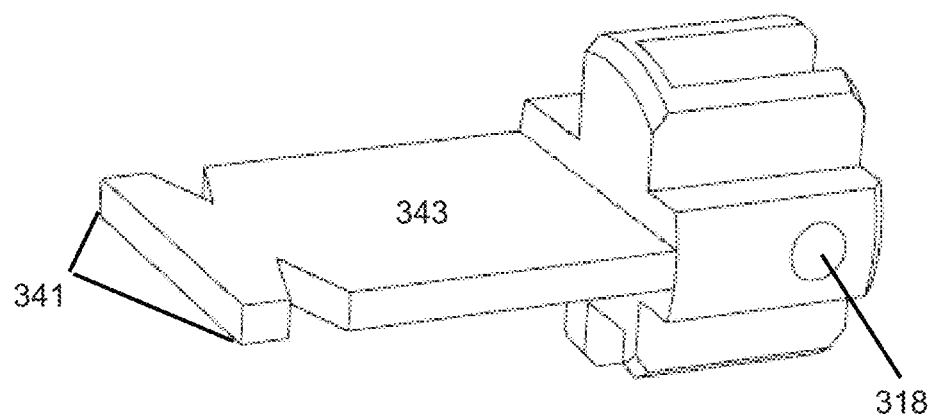
Figure 4E:
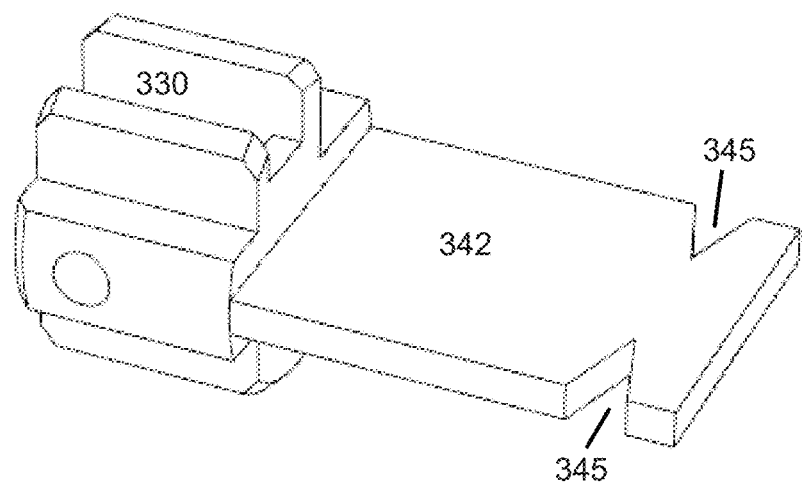
Figure 4F:
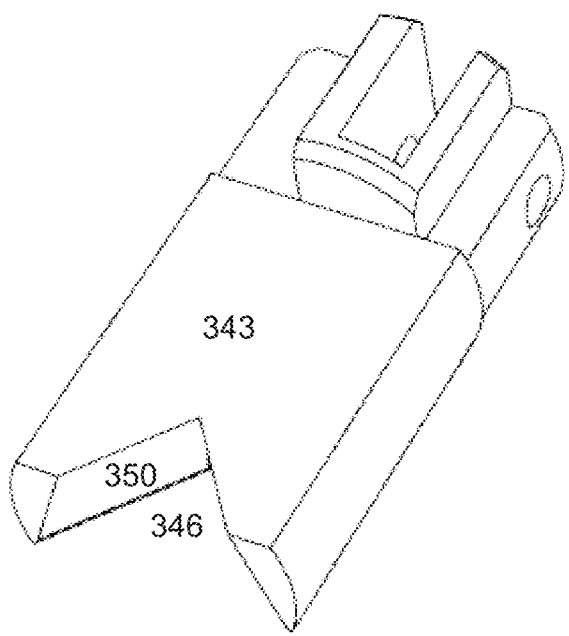
Figure 4G:
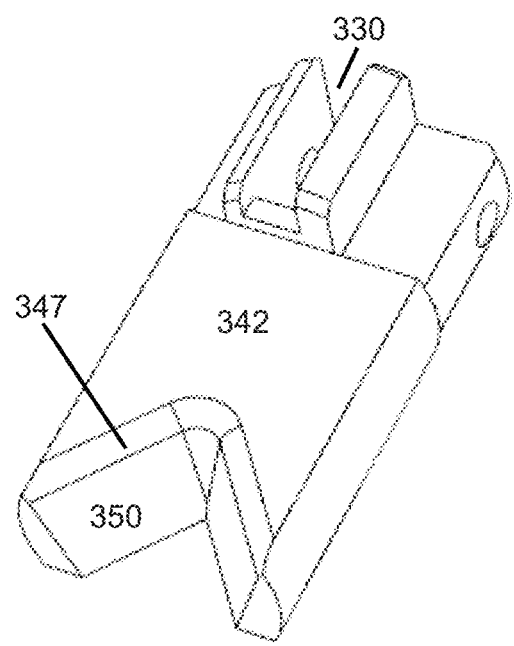
Figure 4H:
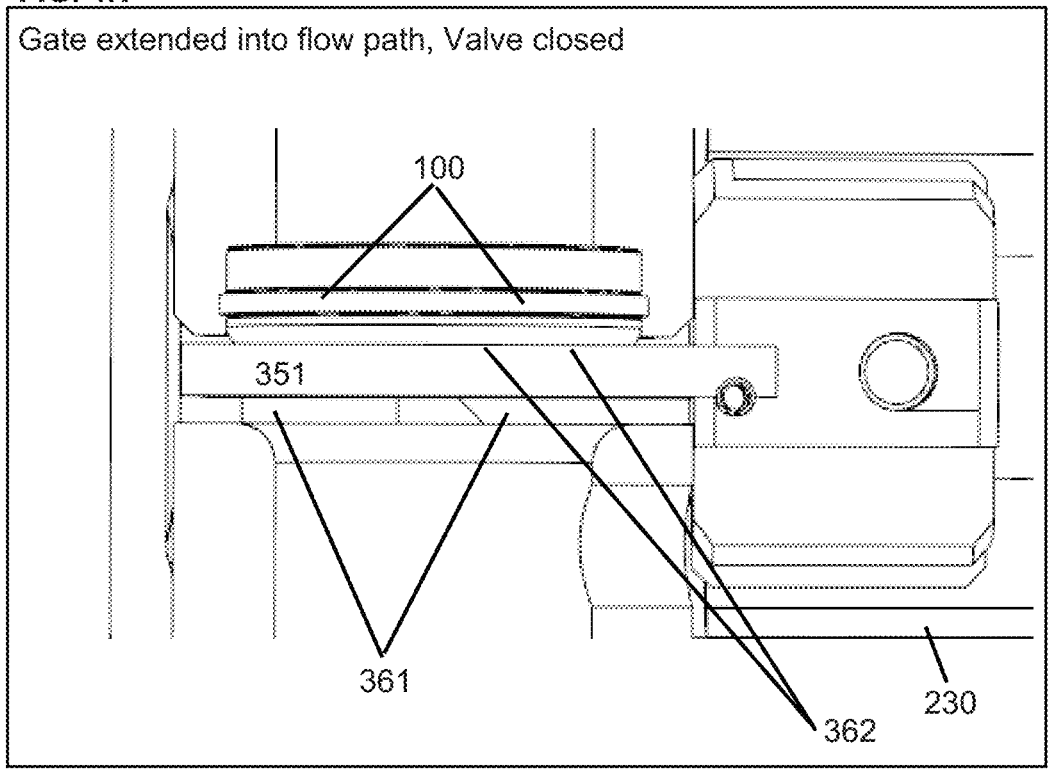
Figure 4I:
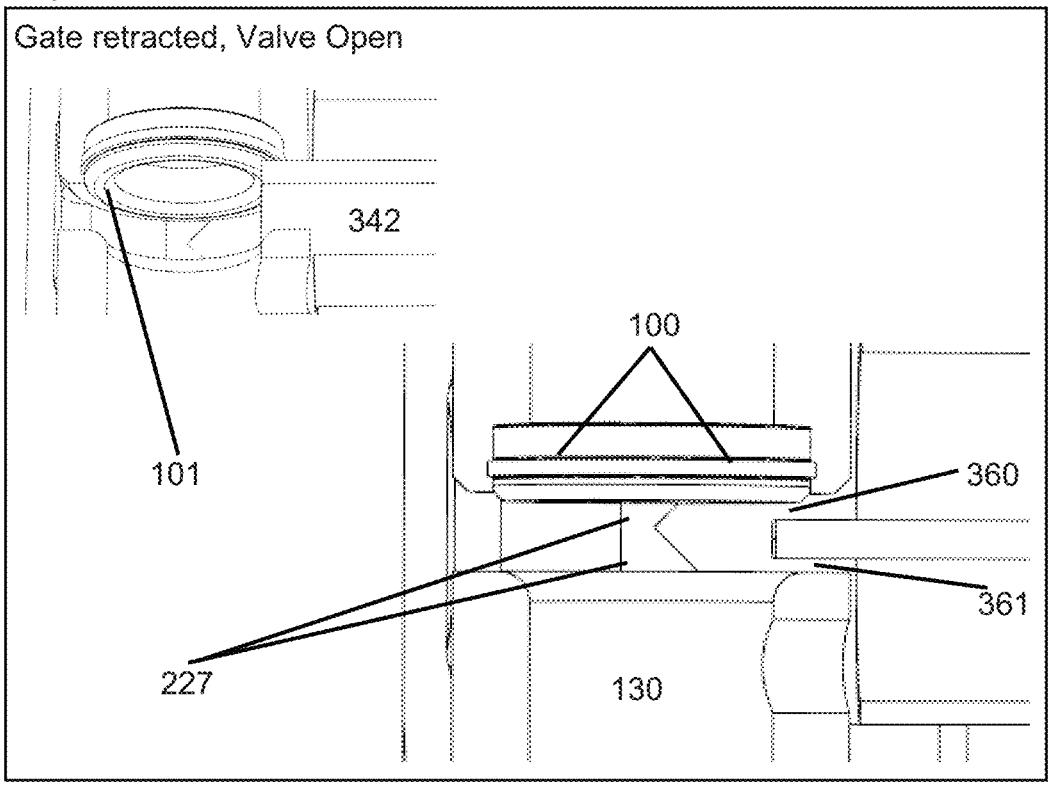
Figure 4J:
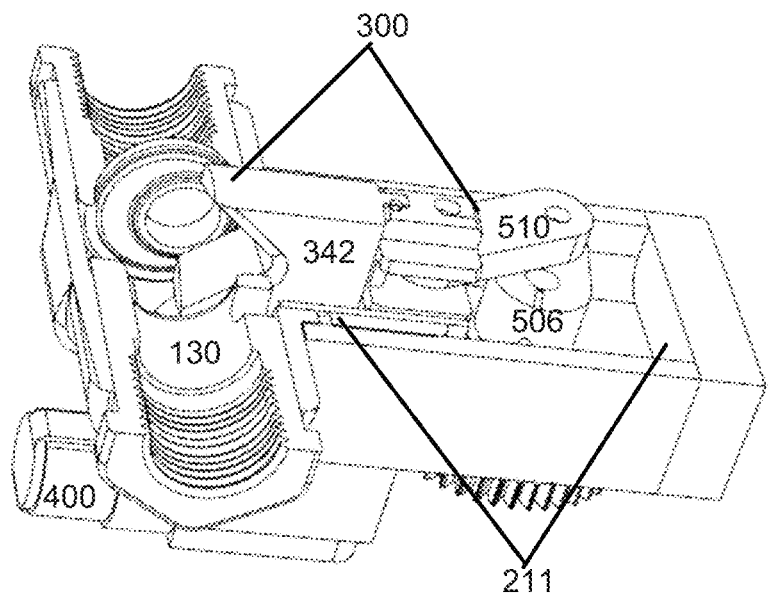

Optionally, in the example configurations illustrated in FIGS. 1A-4K, power is delivered to position the membrane assembly 300 or gate 340 using a DC motor and/or gearmotor 400 attached to a linkage mechanism (see, e.g., FIGS. 1C, 1J, 4J). The linkage is attached to the membrane assembly 300 or gate 340 optionally via membrane assembly pivot bearing inside which a link pin 530 freely rotates (see, e.g., FIG. 1I). A linkage arm 510 (see, e.g., FIGS. 1H), optionally swivels and/or moves inside the membrane assembly pivot slot 330 which is optionally within the membrane assembly pivot base 331. Optionally, the linkage arm 510 comprises a second bar linkage that is attached to a first bar linkage 506 via a freely rotating link pin (e.g., linkage pin 530).

Optionally, a more linear or entirely linear linkage and/or gear system may be used to mobilize the gate and/or membrane assembly such that the rotation or movement of the motor is directly or mostly in a constant or partially constant ratio to the linear movement of the gate into an open, closed or partially open or closed state. Optionally, no electric motor or other power source is used, and the valves may be operated or adjusted manually or autonomously in concert with tension and/or compression devices, such as springs, and/or in concert with fluid flow rates thought the valves.

Optionally, power from the motor and/or gearmotor 400 is delivered from the end of a shaft 426 which is fixed (not freely rotating) to linkage 506 (see, e.g., FIG. 4J). The gearmotor 400 transfers power to the linkage via a linkage drive shaft 425 which is fixed to a linkage 506 via shaft end 426 (see, e.g., FIG. 1H). Optionally, portions of shaft 425 and some or all of the electronics (see FIGS. 1H-O) are separated from wetted cavities using a single O-ring or multiple O-ring seals inserted in the valve body 226 (which may be a solid valve body).

Optionally, said linkage assembly advantageously delivers variable torque, and is optionally configured to deliver its peak torque to complete a valve closure and/or to initiate a valve opening from the point of full closure, where forces, friction, and stiction are greatest given that the full or partial area of the membrane is against the valve seat and against the full force of the fluid pressure. Advantageously, this configuration also enables the use of a smaller less costly and lower power motors and/or gear trains and/or linkages, enables greater membrane assembly and/or gate speed and/or valve open/close times when torque is not need (e.g., in the middle of the gate stroke, between opened/closed positions) and exposes the electronic switching mechanism (see, e.g., switch 611 in FIG. 1N) to relatively low current, which advantageously extends the life of the switches and electronic components. This and similar mechanisms of variable torque to initiate opening of a valve under pressure is similarly disclosed in U.S. Pat. No. 10,927,962, filed Aug. 20, 2020, titled "PRESSURE LOSS MITIGATION AND DURABLE VALVE", incorporated herein by reference in its entirety.

Optionally, in addition or instead, some or all of the foregoing advantageous of the linkage assembly can be accomplished by adding or mixing contours and/or radiuses and/or textures and/or 2-dimensional and/or 3-dimensional design features to the fluid-contact edges of the membrane assembly 300 or gate 340. For example, some edges of the membrane assembly may be configured to have 90 degree angles to enhance pressure loss or turbulence with passing fluids, while other edges may have different angles or shapes based on angles and/or a higher radius to enhance, modify and/or reduce fluid turbulence and/or reduce impact damage from debris (e.g., sand) suspended in the fluid passing through the valve.

Optionally, the entire cavity of 211 (see, e.g., FIGS. 1A-4K) is wetted with process fluid (e.g., irrigation water) when the valve is pressurized with fluid. Optionally, this configuration may have relatively loose tolerances 230 (See, e.g., FIG. 1H), between the membrane assembly pivot base 331 and the inside of the valve chamber 211, where the membrane assembly reciprocates in response to the linkages and motor to position the membrane 303 and or gate 340.

An example tolerance (between the membrane 303 and/or gate 340 surface 342) and the valve seat surface 101 in a ¾" valve may produce gaps greater than ¼ the diameter, or various fractions thereof, of the membrane assembly base 331, though larger and much smaller gaps (e.g., 0.001") are possible. Optionally, there may be a gap 361 (see, e.g., FIG. 1H or 4H) of similar dimensions and ratios as the previous gap, between the base 312 of the membrane assembly or gate 340 and the channel 227 in which the membrane assembly 300 and/or gate 340 reciprocates. These gaps advantageously minimize or reduce abrasion and/or entrapment of particulate (e.g., sand and/or other debris) within the valve housing and between the membrane assembly 300 and/or gate 340 and valve seat assembly 100 and/or valve seat surface 101. Optionally there may be a debris vent 225 which enables accumulating debris in the chamber 211 to be deposited back into the flow stream between the valve inlet and outlets 130, 140. Optionally, the interior of the chamber 211 may incorporate angles of slide 224 (see, e.g., FIG. 1D) such to encourage debris to slide via gravity and/or fluid turbulence towards the debris vent 225 (see, e.g., FIG. 1I), if the valve outlet is higher in elevation than the inlet (as is the case in an optional configuration).

The example configuration illustrated in FIGS. 1J-1O depict an example location and design of an optional electrical circuit and other valve details. Optionally, this circuit may be combined with an encoder and/or motion sensing (e.g., to detect valve component lateral and/or rotational movement) and control equipment. The example circuit may optionally be used in conjunction with pressure and/or fluid flow sensing to enable a valve controller to modify fluid flow and pressure while the valve is in various positions of closed, open, or any number of intermediate positions. The valve controls may also be optionally bypassed with a mechanical lever or other mechanism to enable the valve to be manually operated (e.g., to partially or fully open and close the valve).

Optionally, by way of illustrative example, a ¾" valve managing fluid at 90 psi and 12 VDC, may run peak current in the range of 250-750 mA, but when the switching occurs, the system and switching contacts may see less current at or near the open position, and even lower current at or near the closed position, where stiction (forces needed to initiate membrane movement after valve has sat in closed position) is greatest. Greatest stiction may be when the valve initiates the transition from a closed (no fluid can pass) or nearly closed to open position, and the motor needs to overcome the force on the membrane 303 or gate 340 against the valve seat assembly 100 and/or seat mating surface 101. Similar forces will be used to complete the closing of the valve. Typically, larger valves will use more power and smaller valves less power. A typical open/close time may be 0.1-10 seconds or as long as 5 minutes depending on gearmotor gear ratios and linkage configurations.

In the configurations illustrated in FIGS. 1M-O and FIG. 2, the optional, example electrical circuit is depicted. Motor power is transferred to the linkage system via the shaft 425, which protrudes through the circuit board 600 while also performing functions with the circuit board. Optionally, a motor shaft 425 (see, e.g., FIG. 1I) is attached to one or more components on the circuit board. The spring lever 625 (see, e.g., FIGS. 1J-O) is fixed to shaft 425 (see, e.g., FIGS. 1J-O) and rotates with the shaft (e.g., 180 degrees, optionally, more or less rotation is possible when the valve is configured for partial open/close), along with the shaft (e.g., that optionally only rotates 180 degrees). Optionally, a spring 612 (FIGS. 1J-1O) is fixed to the spring lever 625 and delivers snap action speed and force to the latching arm 605. Optionally, the spring 612 operates in concert with a stationary limit 627 fixed to the end of the spring 612, and a slide limit 626 is attached to the latching arm at a stationary limit 628. This assembly positions via snapping action a magnet 610 at the end of a latching arm close to or away from a SPDT reed switch 611.

Snap action assists with precision or motor operation and reduces precision requirements by limiting the time the magnet spends in transitional activation proximity of the reed switch 611. Optionally, the motor stops rotation once the valve is fully open when the magnet is snapped away from the switch. Optionally, when polarity is reversed, the motor stops rotation again when the valve is in the fully closed position and the magnet is snapped into proximity of the reed switch 611. Optionally, as the spring lever 625 rotates back and forth (e.g., 180 degrees), it positions the spring 612 so that the spring 612 drives a snap action with the magnet and only moves the magnet at the extreme two ends of the 180 degree shaft rotation, back and forth. An advantage of this system is that it discontinues the draw of power once the valve has reached an open or close position, or desired intermediate position, even with a continuous availability of power available to be drawn. Optionally, preventing problems like overshoot of the motor and surges from motor stop are accomplished with Zener type diodes.

In the configurations illustrated in FIGS. 3A-B, a valve is optionally modified with an assembly 700 that vents the outlet side 140 of the valve when the valve is closing and/or after closure when, and as membrane 303 is/has formed a partial and/or complete seal with the valve seat 100 and or seat surface 101. In this configuration the valve may be referred to as a three-way valve. In this configuration, the valve may function both as a two-way valve and a three-way pilot valve to pilot a diaphragm, piston or similarly piloted valve or process.

The assembly 700 pivots both towards and away from the valve body at point 703 but many different points along the rocker arm 701 are possible. As the valve reaches a close position, a pin 703 is positioned or pushed by the end membrane assembly 300 and this pin forces the rocker arm to pivot such that the vent 705 is opened by positioning the vent seal 707 away from the outside of the vent port. When vent 705 is opened, fluid escapes from the outlet side of the valve. The pin 703 reciprocates inside a cavity formed between the inside of the valve channel 227 and the outside of the valve. On the outside of the valve, this pin is optionally held in place by the rocker arm and on another side is positioned, when the valve is closing, by the membrane assembly 300 when the pin is pushed towards the outside of the valve. The vent 705 may also be used to prevent freezing of entrapped water inside the valve when either functioning as a two or three-way valve, thereby enhancing the function of the valve.

Optionally, in the configurations illustrated in FIGS. 1A-4K, the direction of fluid flow, from inlet 130 to outlet 140, is such that the membrane 303 or the sealing surface 343 of the gate 340 is not in the direct flow path velocity when fluid is flowing through the valve. This is in contrast with a conventional diaphragm valve where, when the valve is open or partially open, the diaphragm is typically absorbing the full velocity of the fluid and particulate. Instead, and in the configurations illustrated in FIGS. 1F-1G, the backside 312 of the membrane assembly 303 or backside of the gate 343 is in direct contact with the flow path and can be made of any material disclosed herein or disclosed U.S. Pat. No. 10,927,962, filed Aug. 20, 2020, titled "PRESSURE LOSS MITIGATION AND DURABLE VALVE", incorporated herein by reference in its entirety. The backsides (non-sealing sides) 312 or gate 342 may utilize any materials and/or morphology and/or shape and/or hardness and/or density referenced in this and previous documents to enhance durability of its structural integrity while exposed to abrasive and/or particulate laden fluids and/or fluid speeds that may impart cavitation that damage its structural integrity and/or undesirably change the performance of the valve and its functions.

Optionally, in the configurations illustrated in FIGS. 1A-4K, the constriction and/or restriction of fluid flow and/or pressure and/or the turning of the valve to an Off position (such that no fluid passes through the outlet when the valve is pressurized) is accomplished via the interface of the gate 340 and/or membrane 303 and/or the membrane carrier 300 with the valve seat assembly 100 and/or valve seat surface 101. While the valve is pressurized and fluid is partially or wholly flowing from the inlet 130 to outlet 140, advantageously the pressure and/or momentum of the fluid is typically sufficient to press and/or hold the gate 340 and/or membrane and/or membrane carrier up against valve seat assembly 100 such and/or seat surface 101 that the gate 340 and/or membrane and/or membrane carrier is always or partially aligned (e.g., more than 50% aligned, 10-40% aligned, etc.) with the valve seat and or seat surface to form a full and/or partial seal preventing or minimizing fluid flow past the valve seat.

Optionally, the foregoing sealing may be partially enabled by "play" or loose tolerances between the gate 340 and/or membrane 303 and/or membrane assembly 300 within and/or as the membrane assembly reciprocates within the valve chamber 211 and flow path. For example, in a ¾" valve, this may make the smallest gaps (between the closest point of the base 331 and chamber 211) as large as ¾" in the spaces 230 between the assembly base 331 and chamber 211, but more typically this would be ⅛", or smaller, in a ¾" valve. This gap, along with the nature of the linkages 510 and 506 and free spinning pins 530, enable the gate 340 and/or membrane assembly and/or membrane to float and/or bounce and/or drift in spaces 230, 227 and 231 until flow, either with or without significant pressure, from valve inlet to outlet.

Optionally, this alignment between the valve seat assembly 100 and/or the valve seat surface 101 and the gate 340 and/or membrane 303 and/or membrane assembly 300 may be inexpensively achieved with a flat or mostly planar surface at the seal interface 362. However, curvature and/or other 2-dimensional and 3-dimensional seals or partial seals may be formed to hinder or stop fluid flow from the inlet to outlet of the valve. Optionally, the loose tolerances and/or float and/or bounce and/or drift enable this valve design to provide excellent draining of a fluid system when the valve is mounted with the outlet above the inlet. In this case, the gate 340 and/or membrane and/or membrane assembly will retreat away from the valve seat assembly 100 with the aid of gravity and/or retreating water and/or suction and/or other forces as water is drained from the inlet side of the valve. Once drained, freeze damage (from entrapped fluids) to the valve is minimized or eliminated.

Optionally, in the configurations illustrated in FIGS. 1A-4K the valve may be constructed without the valve seat assembly 100 and so may be configured to not close fully (e.g., to only partially close) and to always allow some fluid to pass. Optionally, the membrane assembly 300 and/or gate 340 may be fully or partially inserted in the fluid flow between the inlet and outlet to thereby obstruct fluid flow rather than form a seal with a valve seat (which is not present in this configuration), and so the valve will leak fluid to some degree. The valve may optionally include the valve seat 100 but may be configured to be generally used periodically or fully in a partially or fully closed state to obstruct flow rather than to fully shut off flow, or the valve may be very occasionally used (e.g., rarely used) to fully shut off flow.

Optionally the valve may be configured to always leak or allow fluid to pass when the membrane assembly is fully inserted into the fluid passage between the inlet 130 and outlet 140. Optionally, the valves may be controlled with the same or similar mechanisms described herein with response to other configuration and optionally utilizing that control circuit illustrated in FIG. 2. Optionally, the gate, membrane assembly and/or membrane may be configured as a cylinder mating against a cylindrical valve seat, although this may be more expensive and require more space than other designs disclosed herein. In general, a flat membrane and/or membrane assembly utilizes the least amount of space and material while maximizing the flow with minimal resistance from the inlet to the outlet.

The example valve designs may be sized and miniaturized (e.g., less than ¾" in diameter of the flow path) and incorporated into "valve-in head" sprinklers.

With reference to FIGS. 1A-1P, 3A-4K, optionally and collectively, the membrane assembly 300, the membrane 303, and/or membrane support 312 may be grouped together and termed the "gate" 340. Optionally, the gate 340 may both be constructed of the same material or as two or more separate parts (and/or two or more different materials). Optionally, the gate 340 refers to the impermeable compressible, flexible sealing element that mates with the valve seat assembly 100 and/or valve seat surface 101 to close off flow completely or partially, and/or to regulate flow. Optionally, the gate 340 is flat and the valve seat surface 101 is completely flat. Optionally, the gate and/or valve seat surface 101 are nominally and/or approximately flat, and minor surface imperfections allow the valve to function appropriately.

Certain material property terms are defined herein that may be relevant under the temperature ranges of −100° F. to +300° F. and forces associated with pressures up to 1,000 psi. The terms "compressibility" and "compressible" and phrase "compressible material" may be defined as the proportional reduction in the thickness of a material under increased pressure or compressive loading. The terms "rigid" and "rigidity" and phrase "rigid material" may be defined as the ability to resist deflection and/or that is not materially compressible or flexible.

The terms "flexible" and "flexibility" and phrase "flexible material" may be defined as the ability to bend or compress without cracking, or the ability to deform elastically and completely or substantially return to its original shape when the applied stress is removed, or materials that can adapt when external changes occur.

The term "rigid" and phrase "rigid material", may optionally be defined as having greater physical rigidity than a flexible material. Similarly, the term and phrase "flexible" and "flexible material", may be defined as having greater physical flexibility than a rigid material. For example, a fluoropolymer may be considered flexible or as having greater material flexibility than a stainless steel or ceramic material. Therefore, in the example configurations illustrated in FIGS. 1A-1P and 4A-4K, an impermeable, flexible fluoropolymer may optionally serve as the gate 340 and may movably seal against a rigid stainless steel (or any other metal) or ceramic valve seat assembly 100.

Optionally, any combination of suitable materials may be used for the flexible impermeable membrane 303 and/or gate 340 and/or membrane support 312 versus the valve seat assembly 100 as long as one or the other is more flexible and/or compressible than the other. Optionally, two or more identically compressible and/or flexible and/or rigid materials may be used for both the valve seat assembly 100 and gate 340, or combinations thereof. Optionally, similar, or identical materials may be used for both the valve seat assembly 100 and the gate 340. Rigidity, compressibility, and flexibility do not solely depend on material selection, it also depends on material shape. A fluoropolymer, for example, may have varying degrees of flexibility depending on its 2-Dimensional and 3-Dimensional shapes. For example, two identical materials may display greater or lesser flexibility and/or compressibility and/or rigidity depending on thickness, length or width (in relation to thickness) and any number of infinite variations in 2-dimensional and 3-dimensional variations play a role in these physical properties of compressibility, flexibility, and rigidity.

Optionally, during fluid flow through the example valves (see, e.g., FIGS. 1A-1P, 3A-4K), the valves may be fully opened, with the gate 340 fully or mostly retracted into the chamber 211 such that fluid flow through the valve is not hindered or mostly unhindered by any part of the gate 340. Optionally, during fluid flow through the example valves (see, e.g., FIGS. 1A-1P, 4A-4K), the valves' closure state may transition to a position of fully closed, with the gate 340 fully inserted into the flow path such that fluid flow through the valve is completely hindered by the gate which is larger in cross sectional area than the valve seat (100).

Optionally, and without limitation, during fluid flow through the example valves (see, e.g., FIGS. 1A-1P, 3A-4K), the valves, depending for example and without limitation on flow rates and pressures, the fluids may exert and manifest fluidic properties (including all those known and unknown to the fields of fluid dynamics and fluid mechanics, including forces and flows). The properties may also be referred to as "fluidic-properties". Optionally, these fluidic-properties may be used to modify (including to increase, decrease, adjust, or control) force and power as needed when changing the position the gate 340, including to open, close, or position the gate in a semi-open or semi-closed state. The force and power influences may also be referred to as "fluidic-force-influences".

The fluidic-force-influences properties may be employed in concert with multiple devices (either alone or in concert with any one or multiple devices) including motors, tension and/or compression devices (including but not limited to tension and/or compression devices such as springs), mechanical devices (including but not limited to force modifying linkages and gears), in a process called "Fluidic-force-control". The fluidic-properties, fluidic-force-influences, and/or fluidic-force-control, may optionally be employed alone or in concert and may be employed to provide greater control over linearity of forces and/or flow dynamics so they can be managed with adjustable or non-adjustable controls and gate position drivers, such as gear-motors 400, linkage assemblies 506, 510, and/or tension and/or compression devices that optionally may replace linkage assemblies.

Adjustments and controls may be manual, mechanical, electronic, remote, automatic, or autonomous (mechanical, non-electronic, self-responsive) or any combination thereof. The adjustment controls may be utilized with and on the valve alone or in concert with other devices such as pressure regulators upstream of the valve. Collectively, the technique disclosed herein may be employed, exploited, controlled, modified, and otherwise utilized in concert with each other, or separately, or in combinations thereof and will be referred to as "fluidic-control".

The terms tension and/or compression, as used herein, may include strain, stretch, force, compress, tighten, and constrain unless the context indicates otherwise. Thus, a tension device may be configured to cause tension, stain, stretch, forcing, compressing, or tightening.

Optionally, the example valves (see, e.g., FIGS. 1A-1P, 3A-4K), may incorporate a valve seat assembly 100 with a fluid flow path narrower in cross-sectional area than that of majority of the valve's flow path and/or the cross-sectional area of the gate 340. As an example, in a valve with a partially or entirely circular flow path, if the inlet and/or outlet are ¾" diameter and/or with ¾" flow path diameters, the valve seat assembly and/or surface 101 may be smaller (e.g., ½" in diameter). In this example, the gate width and/or cross-sectional area may also be reduced to fully or partially cover this ½" diameter valve seat; or the gate 340 width and/or cross sectional area may remain sufficient to fully or partially close off flow with a ¾" diameter valve seat.

Figure 4K:
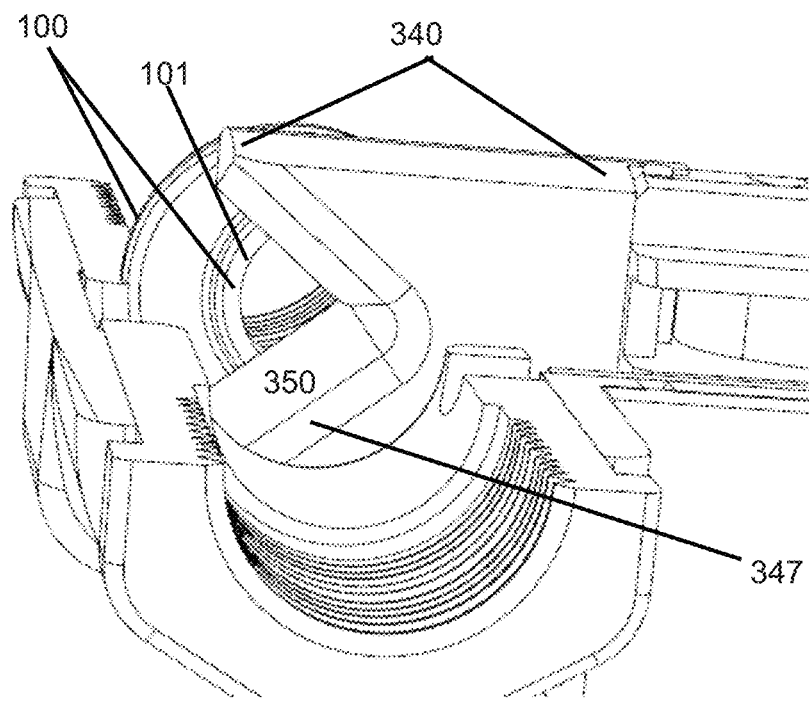

Optionally, greater width and/or cross-sectional area, and various degrees of cross-sectional area of the gate (e.g., ¾" width) versus the valve seat (e.g., ½" diameter), may deliver modified (greater or lesser) ratios of gate surface-area to fluid flow rate (as in gallons per minute (gpm)) when fluid is flowing through the valve (see, e.g., FIGS. 4J-4K). Optionally, modifying this ratio, and optionally with other configurations presented herein, the valve will have the aforementioned fluidic-control capabilities.

As an example, with novel gate shapes (see, e.g., FIGS. 4A-4k), dimensions, cross section areas, cross section shapes, ratios of gate 340 dimensions to valve seat 100 and seat surface 101 dimensions, fluidic-properties such as the Bernoulli effect (e.g., net pressure forces due to the Bernoulli effect), may be utilized and controlled to lower the force requirements (e.g., to mobilize the gate) of valves and/or to provide more precise control of valve flow rates and pressure; and/or to provide greater or less positional tolerance of the valve gate. For example, the gate 340 may have a "v" or "u" shaped leading edge.

Fluidic-properties may optionally be controlled/modified by changing the cross-sectional area of a gate 340 at strategic positions, such as relatively close the gate's leading edge as illustrated in FIGS. 4D-4E. Flow paths, for example path 345, are cut into the gate which can manipulate fluidic-properties at the last stages of valve closure, to lower position force requirements. The foregoing can be employed alone or in concert with the aforementioned fluidic-control strategies, adjustments, and capabilities. For example, notches 345 may be cut into or other formed on the gate sides as illustrated.

Figure 1K:
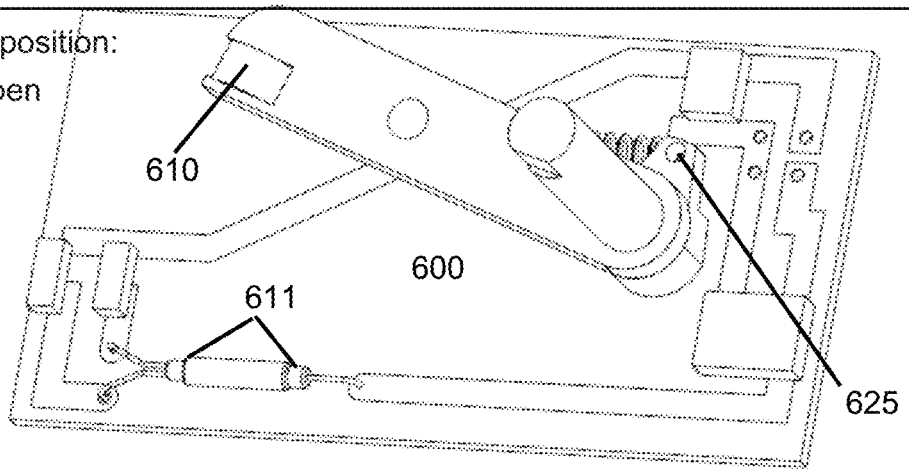
Figure 1L:
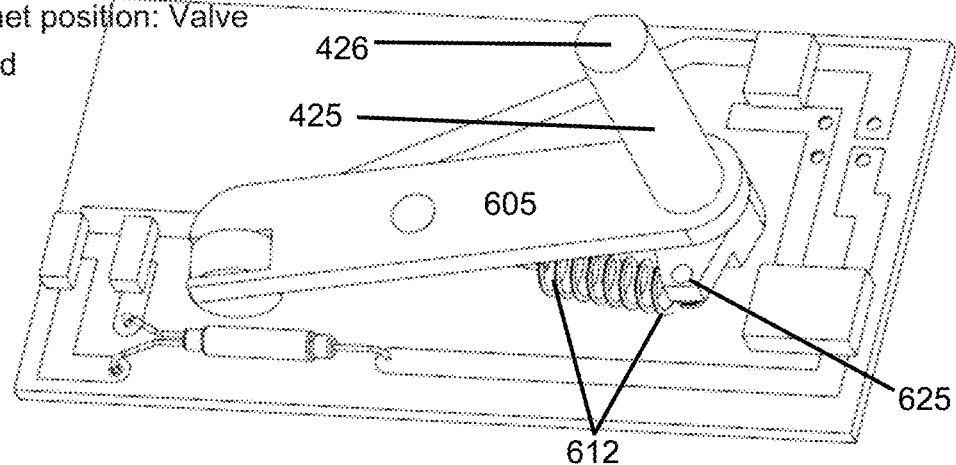
Figure 1M:
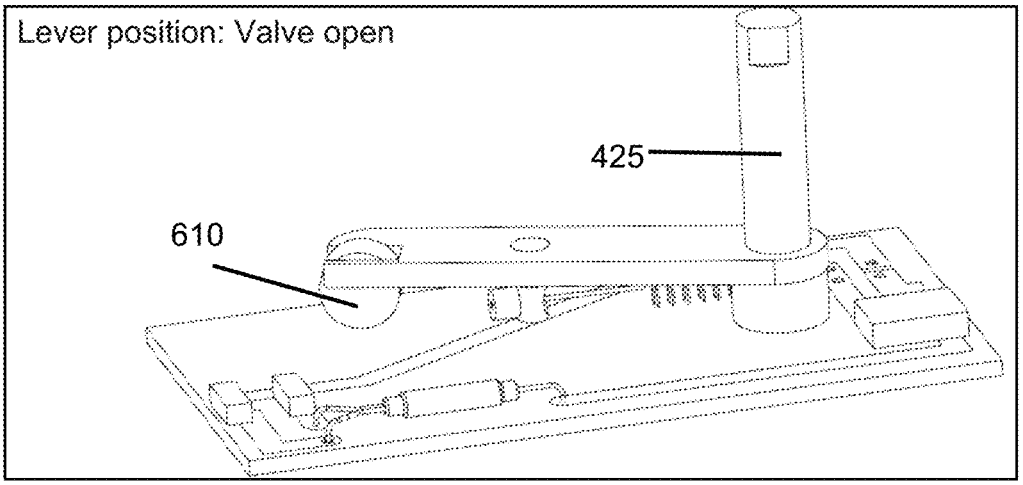
Figure 1N:
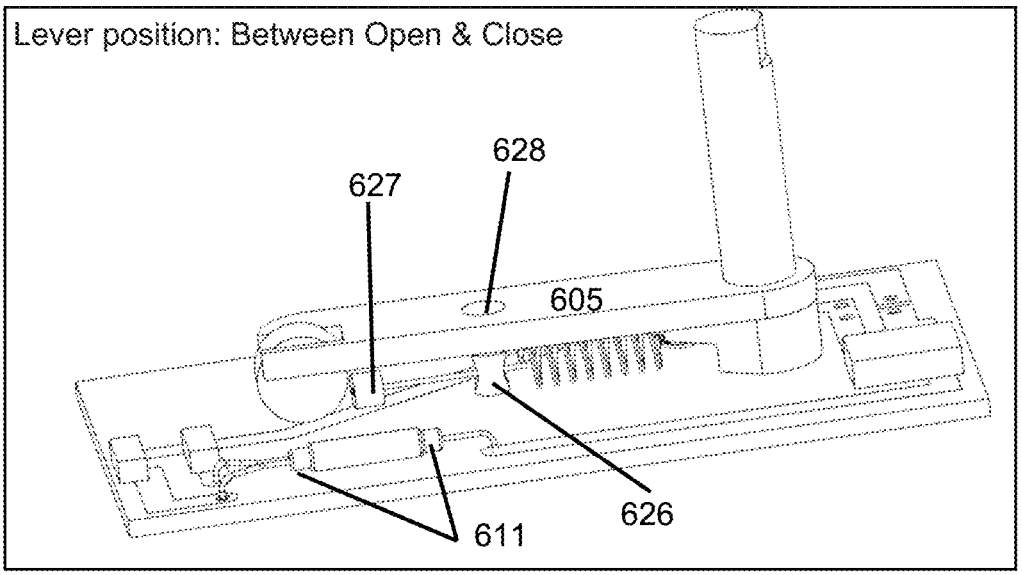
Figure 1O:
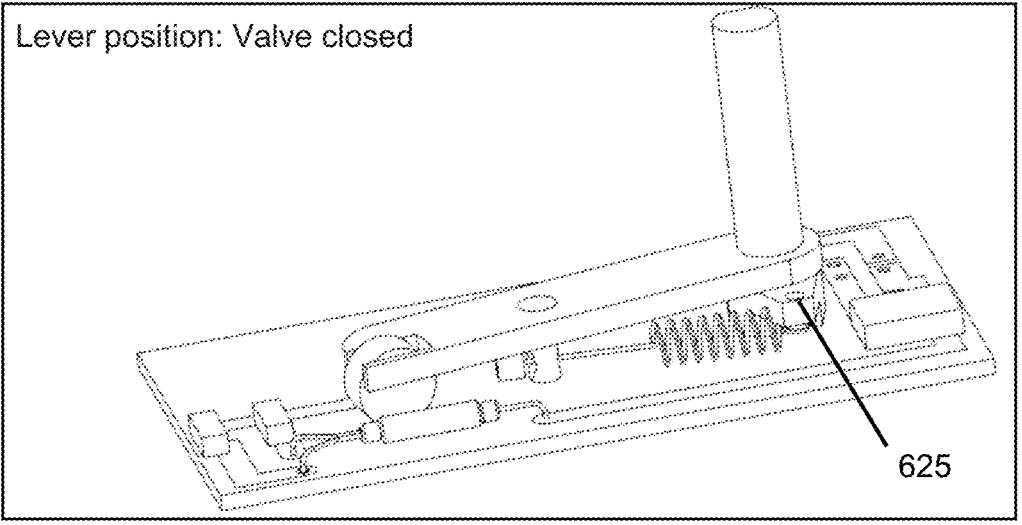

Optionally, as fluid flows through the example valves (see, e.g., FIGS. 1A-1P, 3A-4K), a partially opened and/or partially closed valve is produced by positioning the gate 340 somewhere between fully open and fully closed; and there are an innumerable number of positions of partial open and/or partially closed states, and in the example where the valve is approximately ½ closed (see, e.g., FIGS. 1J-1K).

Optionally, when partially open or partially closed, utilizing configurations disclosed herein, the valve will possess and employ fluidic-property control capabilities. An example valve being supplied by an upstream pressure regulator may have a steady supply of fluid to the valve inlet at approximately and nominally 20 psi and 10 gpm, but a partially closed valve may reduce the downstream flow from that valve approximately and nominally to 8-4 gpm as well as producing a reduction in pressure from, for example, approximately and nominally 20 psi down nominally to 15-5 psi. In this case, the valve may function as a flow reduction device and may deliver a great variety of reduced downstream flow rates and reduced pressures. The capabilities expressed in this paragraph can be employed alone or in concert with the aforementioned fluidic-control strategies, adjustments, and capabilities.

Optionally, in another example valve (see, e.g., FIGS. 4J-4K) additional novel features may be employed that further expand the aforementioned fluidic-control capabilities. These attributes can enable greater resolution, fine tuning of fluidic control and greater options for positional tolerances when positioning any gates 340. Because the gate underside 342 does not interface with a valve seat 100 and/or seat surface 101, the gate thickness may be increased without negatively affecting the interface of the gate and valve seat 362).

Optionally, in a valve with a 0.1" to 0.75" diameter valve seat, a relatively thick gate (e.g., 0.5") versus a relatively thinner gate (e.g., 0.125") may be employed, and as inlet pressure/flow increases, increased flow will increase and/or modify the Bernoulli effect (e.g., net pressure forces due to the Bernoulli effect), and/or other fluidic-properties on the leading gate edge which have the ability to "pull" the gate into a more closed state, and further into the valve flow path. In this example, the bar linkage assembly 506, 510 may optionally be disengaged from the motor shaft end 426 so that the gate is freely pulled into the flow path of the fluid; or the bar linkage may be 506, 510 may be secured to the motor shaft end 426 which is disengaged from the motor and instead attached to a rotational resistance mechanism biased with adjustable tension and/or compression devices, including but not limited to those commonly known to the arts.

Optionally, the linkage assembly may be replaced with adjustable tension and/or compression devices or other force modifying devices such as a spring with an adjustable tension placed inside chamber A 211 that adjustably pushes and/or resists the pulling of the gate into the flow path by the Bernoulli effect (e.g., net pressure forces due to the Bernoulli effect), and/or other fluidic-properties. Optionally, the force modifying mechanisms, which may be adjustable (e.g., electronically adjustable via a remote control, and/or manually using a local mechanism) or non-adjustable, will bias the valve gate towards various degrees of an open and/or closed position, in order to maintain a steady rate of flow out of the valve while the pressure upstream of the valve varies.

Optionally, when partially open or partially closed, and with other configurations presented herein, the valve will have fluidic-control capabilities such as flow and/or pressure control. An example valve, being supplied by a variable fluid pressure cycling nominally and approximately between 25-35 psi, may therefore maintain the pressure downstream of the valve nominally and approximately at 25 psi. In this case, the valve may function as a pressure and flow regulating valve. The foregoing may be employed alone or in concert with the aforementioned fluidic-control strategies, adjustments, and capabilities.

Optionally, with reference to FIGS. 4A-4G, and any material disclosed herein or disclosed in U.S. Pat. No. 10,927,962, filed Aug. 20, 2020, titled "PRESSURE LOSS MITIGATION AND DURABLE VALVE", incorporated herein by reference in its entirety, the gate 340 may take on an infinite number of novel shapes and 2-Dimensional and 3-Dimensional variations. Optionally, these shapes advantageously increase fluidic-control capabilities. These shapes also advantageously increase and/or decrease and/or modify force requirements required to change the gate position, either with a motor, manually, or autonomously with resistance (compression or tension) devices. Such shapes may advantageously lower motor, manual or other force requirements to position the gate and they may advantageously make non-linear fluidic forces and/or other fluidic phenomena acting on the gate more linear. Such shapes may advantageously make the valve more easily controllable manually or remotely, and/or may decrease positional tolerance requirements of the gate and related positioning mechanisms. These gate-driven fluidic-forces may or may not be utilized in concert with tension/compression devices (e.g., a spring), motors, manual hand actuated controls, or other means of control known to the arts.

For example, in order to prevent fluid flow rate from exceeding a first threshold, the valve may be configured so that when the fluid flow reaches about the first threshold, a spring (or other tension/compression device), in concert with fluidic forces such as Bernoulli effect forces, causes a gate to be moved to partially or wholly seal the valve seat to thereby reduce the fluid flow rate (optionally without a motor and/or without any remote control). By way of further example, the valve may be configured so that when the present fluid flow falls below a second threshold, a spring (or other tension/compression device) in concert with fluidic forces such as Bernoulli effect forces, causes the gate to be moved to partially or completely unseal the valve seat to thereby increase the fluid flow rate (optionally without a motor and/or without any remote control). Optionally, in this valve configuration, there may be no linkages to the gate, and a spring connects to the gate where the linkage connects to the gate in certain other configurations disclosed herein, and that spring then connects to the back of the valve, approximately where the motor is in certain other configurations disclosed herein.

In FIGS. 4A-4G, example membrane assemblies are illustrated with flat surfaces of the gates that act as the membrane that interfaces with the valve seat surface 101.

Examples are disclosed of novel two-dimensional and three-dimensional gate 340 shapes that incorporate 90-degree edges on the leading edge 341, 349, for example, radii 347 and chamfers 348. Optionally, the leading edge may be "v" or "u" shaped. Optionally, novel designs can be on the fluid-entry side 342 or, as illustrated in FIG. 4F, the fluid-exit side 343, or both fluid entry and exit sides. Edges 351 may be modified with any shapes, including wave-like patterns, serrations, or other shape (see, e.g., FIGS. 4D-4E). Optionally, the leading edge 341 may be modified and/or the gate sides may be modified (see, e.g., FIGS. 4D-4E). The foregoing design examples may be employed alone or in concert with the aforementioned fluidic-control strategies, adjustments, and capabilities.

Thus, various valves are disclosed that provide reduced pressure drop, higher reliability, more precise control, and less susceptibility to debris blockages and wear.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component via another component or directly connected to the second component.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The previous description of the disclosed implementations is provided to enable any person skilled in the art to make or use the present invention. Various modifications to these implementations will be readily apparent to those skilled in the art, and the generic principles defined herein may be applied to other implementations without departing from the scope of the invention. For example, it will be appreciated that one of ordinary skill in the art will be able to employ a number corresponding alternative and equivalent structural details, such as equivalent ways of fastening, mounting, coupling, or engaging tool components, equivalent mechanisms for producing particular actuation motions, and equivalent mechanisms for delivering electrical energy. Thus, the present invention is not intended to be limited to the implementations shown herein but is to be accorded the widest scope consistent with the principles and novel features disclosed herein.

What is claimed is:

1. A valve, comprising:
    a housing having an exterior surface and an interior surface, the interior surface defining at least one fluid chamber,
    the housing having:
        a fluid inlet comprising:
            a first fluid inlet orifice configured to engage a first fluid conduit, and
            a second fluid inlet orifice,
            wherein the fluid inlet is configured to communicate fluid from the first fluid conduit via the first fluid inlet orifice to the second fluid inlet orifice, and from the second fluid inlet orifice to the fluid chamber;
        a fluid outlet comprising:
            a first fluid outlet orifice, and
            a second fluid outlet orifice comprising a valve seat, wherein the first fluid outlet orifice is configured to engage a second fluid conduit;
        at least a first pivoting linkage and a second pivoting linkage, wherein the first pivoting linkage and the second pivoting linkage are at least partly positioned in the fluid chamber, the second pivoting linkage coupled to a first portion of the first pivoting linkage positioned in the fluid chamber, the second pivoting linkage having a plane of rotation perpendicular to the valve seat; and
        a slidable valve seal, coupled to a second portion of the second pivoting linkage.

2. The valve as defined in claim 1, wherein the second pivoting linkage comprises:
    a first rotatable link via which the second pivoting linkage is rotatably coupled to the first pivoting linkage, and
    a second rotatable link at an end portion of the second pivoting linkage via which the second pivoting linkage is perpendicularly rotatably coupled to the slidable valve seal.

3. The valve as defined in claim 1, wherein the slidable valve seal is configured to seal under the effect of fluid pressure.

4. The valve as defined in claim 1, wherein the slidable valve seal has a first surface and a second surface, wherein the first surface is closer to the second fluid outlet orifice than the second surface when the slidable valve seal is located between the second fluid inlet orifice and the second fluid outlet orifice.

5. The valve as defined in claim 1, wherein the slidable valve seal has a first surface and a second surface, wherein the first surface is closer to the second fluid outlet orifice than the second surface when the slidable valve seal is located between the second fluid inlet orifice and the second fluid outlet orifice, wherein the second surface is spaced apart from a wall of the fluid chamber by a fluid chamber cavity.

6. The valve as defined in claim 1, wherein the valve comprises only one valve seat.

7. The valve as defined in claim 1, wherein the slidable valve seal is configured to travel along a path such that the first surface of the slidable valve seal distally positions and aligns with the second fluid outlet orifice, and at least partly in response to fluidic forces, axially positions with the second fluid outlet orifice to result in planar contact with at least a portion the second fluid outlet orifice.

8. The valve as defined in claim 1, wherein when the slidable valve unseals or partially unseals the second fluid outlet, debris within the fluid chamber is enabled to exit the valve.

9. The valve as defined in claim 1, wherein the second fluid outlet orifice comprises a valve seat, wherein when the slidable valve seal seals the second fluid outlet orifice, at least a portion of the first surface of the slidable valve seal is in contact with the valve seat of the second fluid outlet orifice.

10. The valve as defined in claim 1, wherein the slidable valve seal comprises a gate.

11. The valve as defined in claim 1, wherein in an absence of a first fluid pressure within the fluid chamber, a force and/or power needed to slide the slidable valve seal is reduced.

12. The valve as defined in claim 1, further comprising a motor configured to slide the slidable valve seal from a first position, wherein the slidable valve seal is not positioned between the between the second fluid inlet orifice and the second fluid outlet orifice, to a second position, wherein the slidable valve seal is positioned between the between the second fluid inlet orifice and the second fluid outlet orifice, wherein the motor does not exert a force to press the slidable valve seal against the second fluid outlet.

13. The valve as defined in claim 1, wherein the valve is configured to partially open or partially close to modify flow rates of fluid flowing through the valve from the fluid inlet to the fluid outlet.

14. The valve as defined in claim 1, wherein the valve is configured to partially open or partially close to modify fluid pressure.

15. The valve as defined in claim 1, wherein the slidable valve seal is not held against the second fluid outlet by a physical valve structure or valve device that produces forces on the valve seal.

16. A valve, comprising:
    a housing having an exterior surface and an interior surface, the interior surface defining at least one fluid chamber,
    the housing having:
        a fluid inlet comprising:
            a first fluid inlet orifice configured to engage a first fluid conduit, and
            a second fluid inlet orifice,
            wherein the fluid inlet is configured to communicate fluid from the first fluid conduit via the first fluid inlet orifice to the second fluid inlet orifice, and from the second fluid inlet orifice to the fluid chamber;
        a fluid outlet comprising:
            a first fluid outlet orifice, and
            a second fluid outlet orifice comprising a valve seat, wherein the first fluid outlet orifice is configured to engage a second fluid conduit;

at least a first pivoting linkage and a second pivoting linkage, wherein the first pivoting linkage and the second pivoting linkage are at least partly positioned in the fluid chamber, the second pivoting linkage coupled to the first pivoting linkage positioned in the fluid chamber, the second pivoting linkage having a plane of rotation perpendicular to the valve seat; and a slidable valve seal, coupled to the second pivoting linkage.

17. The valve as defined in claim 16, wherein the second pivoting linkage comprises:

a first rotatable link via which the second pivoting linkage is rotatably coupled to the first pivoting linkage, and a second rotatable link at an end portion of the second pivoting linkage via which the second pivoting linkage is perpendicularly rotatably coupled to the slidable valve seal.

18. The valve as defined in claim 16, wherein the slidable valve seal is configured to under the effect of fluid pressure.

19. The valve as defined in claim 16, wherein the slidable valve seal has a first surface and a second surface, wherein the first surface is closer to the second fluid outlet orifice than the second surface when the slidable valve seal is located between the second fluid inlet orifice and the second fluid outlet orifice.

20. The valve as defined in claim 16, wherein the slidable valve seal has a first surface and a second surface, wherein the first surface is closer to the second fluid outlet orifice than the second surface when the slidable valve seal is located between the second fluid inlet orifice and the second fluid outlet orifice, wherein the second surface is spaced apart from a wall of the fluid chamber by a fluid chamber cavity.

21. The valve as defined in claim 16, wherein the valve comprises only one valve seat.

22. The valve as defined in claim 16, wherein the slidable valve seal is configured to travel along a path such that the first surface of the slidable valve seal distally positions and aligns with the second fluid outlet orifice, and at least partly in response to fluidic forces, axially positions with the second fluid outlet orifice to result in planar contact with at least a portion the second fluid outlet orifice.

23. The valve as defined in claim 16, wherein at least one shaped portion is configured to induce Bernoulli effects, wherein the Bernoulli effects control and/or influence fluid flow inside, the valve, upstream of the valve, and/or downstream of the valve.

24. The valve as defined in claim 16, wherein at least one shaped portion comprises an angled leading edge having an angle different than 90 degrees.

25. The valve as defined in claim 16, wherein at least one shaped portion comprises a v-shaped or u-shaped leading edge.

26. The valve as defined in claim 16, wherein fluidic forces, comprising upstream pressure in the valve, operate in concert with Bernoulli effect forces at a leading edge of the slidable valve seal to position the slidable valve seal.

27. The valve as defined in claim 16, wherein a first shaped portion is configured to induce Bernoulli effects, wherein when a second shaped portion is exposed to upstream pressure, the upstream pressure mobilizes the slidable seal due to a net force, with the upstream pressure exerting force on the second surface of the slidable seal which is free to move autonomously in concert with and aided by a reduced fluid pressure from Bernoulli effects at the first shaped portion.

28. The valve as defined in claim 16, further comprising one or more tensioning and/or compression devices configured to damper, control, offset and/or work in concert with fluidic forces.

29. The valve as defined in claim 16, wherein the slidable valve seal comprises a gate.

30. The valve as defined in claim 16, further comprising a motor configured to slide the slidable valve seal from a first position, wherein the slidable valve seal is not positioned between the between the second fluid inlet orifice and the second fluid outlet orifice, to a second position, wherein the slidable valve seal is positioned between the between the second fluid inlet orifice and the second fluid outlet orifice, wherein the motor does not exert a force to press the slidable valve seal against the second fluid outlet.

31. The valve as defined in claim 16, wherein the valve is configured to partially open or partially close to modify flow rates of fluid flowing through the valve from the fluid inlet to the fluid outlet and/or modify fluid pressure.

32. A valve, comprising:

a housing having an exterior surface and an interior surface, the interior surface defining at least one fluid chamber, the housing having:

a fluid inlet comprising:

a first fluid inlet orifice configured to engage a first fluid conduit, and a second fluid inlet orifice, wherein the fluid inlet is configured to communicate fluid from the first fluid conduit via the first fluid inlet orifice to the second fluid inlet orifice, and from the second fluid inlet orifice to the fluid chamber;

a fluid outlet comprising:

a first fluid outlet orifice, and a second fluid outlet orifice, wherein the first fluid outlet orifice is configured to engage a second fluid conduit, and the second fluid outlet orifice comprising a seat;

at least a first pivoting linkage and a second pivoting linkage, wherein the first pivoting linkage and the second pivoting linkage are at least partly positioned in the fluid chamber, the second pivoting linkage coupled to the first pivoting linkage positioned in the fluid chamber, the second pivoting linkage having a plane of rotation perpendicular to the valve seat; and a slidable valve seal coupled to the second pivoting linkage.

33. The valve as defined in claim 32, wherein the second pivoting linkage comprises:

a first rotatable link via which the second pivoting linkage is rotatably coupled to the first pivoting linkage, and a second rotatable link at an end portion of the second pivoting linkage via which the second pivoting linkage is perpendicularly rotatably coupled to the slidable valve seal.

34. The valve as defined in claim 32, wherein the slidable valve seal is configured to under the effect of fluid pressure.

35. The valve as defined in claim 32, wherein the slidable valve seal has a first surface and a second surface, wherein the first surface is closer to the second fluid outlet orifice than the second surface when the slidable valve seal is located between the second fluid inlet orifice and the second fluid outlet orifice.

36. The valve as defined in claim 32, wherein the slidable valve seal has a first surface and a second surface, wherein the first surface is closer to the second fluid outlet orifice than the second surface when the slidable valve seal is located between the second fluid inlet orifice and the second fluid outlet orifice, wherein the second surface is spaced apart from a wall of the fluid chamber by a fluid chamber cavity.

37. The valve as defined in claim 32, wherein the valve comprises only one valve seat.

38. The valve as defined in claim 32, wherein the slidable valve seal is configured to travel along a path such that the first surface of the slidable valve seal distally positions and aligns with the second fluid outlet orifice, and at least partly in response to fluidic forces, axially positions with the second fluid outlet orifice to result in planar contact with at least a portion the second fluid outlet orifice seat.

39. The valve as defined in claim 32, wherein the slidable valve seal is more resilient than the second fluid outlet orifice seat at least partly as a result of a slidable valve seal material and/or a shape of the slidable valve seal and/or fluidic conditions.

40. The valve as defined in claim 32, wherein the slidable valve seal comprises a compressible membrane and a rigid substrate.

41. The valve as defined in claim 32, wherein the slidable valve seal is more resilient than the second fluid outlet orifice seat at least partly as a result of a slidable valve seal material, where material properties of the slidable valve seal change when the slidable valve seal material is not in contact with the second fluid outlet orifice seat.

42. The valve as defined in claim 32, wherein the slidable valve seal is more resilient than the second fluid outlet orifice seat at least partly as a result of a slidable valve seal material where material properties of the slidable valve seal change when the slidable valve seal material is in partial or full contact with the second fluid outlet orifice seat.

43. The valve as defined in claim 32, wherein the second fluid outlet orifice seat and the slidable valve seal comprise a same material but possess different physical properties at least partly as a result of their respective shapes and/or fluidic conditions and/or fluidic forces.

44. The valve as defined in claim 32, wherein the slidable valve seal comprises a gate.

45. The valve as defined in claim 32, wherein the valve is configured to partially open or partially close to modify flow rates of fluid flowing through the valve from the fluid inlet to the fluid outlet and/or modify fluid pressure.

* * * * *

UNITED STATES PATENT AND TRADEMARK OFFICE
CERTIFICATE OF CORRECTION

PATENT NO. : 12,013,047 B1
APPLICATION NO. : 18/343602
DATED : June 18, 2024
INVENTOR(S) : William E. Hurst et al.

It is certified that error appears in the above-identified patent and that said Letters Patent is hereby corrected as shown below:

In the Specification

On Column 1, Line 44: Delete "flow)" and insert -- flow). --.

On Column 6, Line 27: Delete "'valves'." and insert -- "valves". --.

On Column 7, Line 13 (Approx.): Delete "state" and insert -- state. --.

On Column 8, Line 64: Delete "RasberryPi" and insert -- Raspberry Pi --.

On Column 10, Line 44: Delete "fluoro elastomer," and insert -- fluoroelastomer, --.

On Column 11, Line 59: Delete "101. and" and insert -- 101 and --.

On Column 12, Line 51: Delete "FIGS." and insert -- FIG. --.

On Column 13, Line 18: Delete "may by" and insert -- may be --.

On Column 13, Line 43: Delete "FIGS." and insert -- FIG. --.

On Column 14, Line 46: Delete "and or" and insert -- and/or --.

On Column 14, Line 49: Delete "¼" and insert -- ¼ --.

On Column 15, Line 46: Delete "1J-10)" and insert -- 1J-1O) --.

On Column 16, Line 10: Delete "and or" and insert -- and/or --.

On Column 17, Line 5: Delete "and or" and insert -- and/or --.

Signed and Sealed this
Twenty-ninth Day of April, 2025

Coke Morgan Stewart
*Acting Director of the United States Patent and Trademark Office*

On Column 20, Line 28: Delete "path345," and insert -- path 345, --.

On Column 22, Line 24: Delete "Chamfers" and insert -- Chambers --.

In the Claims

On Column 24, Line 34: In Claim 12, delete "between the between the" and insert -- between the --.

On Column 24, Line 36: In Claim 12, delete "between the between the" and insert -- between the --.

On Column 25, Line 22: In Claim 18, after "to" insert -- seal --.

On Column 26, Line 13: In Claim 30, delete "between the between the" and insert -- between the --.

On Column 26, Line 15: In Claim 30, delete "between the between the" and insert -- between the --.

On Column 26, Line 61: In Claim 34, after "to" insert -- seal --.